(12) United States Patent
Mepham et al.

(10) Patent No.: US 9,206,862 B2
(45) Date of Patent: Dec. 8, 2015

(54) ENHANCED DUAL CLUTCH TRANSMISSION

(71) Applicant: Ricardo, Inc., Van Buren Township, MI (US)

(72) Inventors: Shaun E. Mepham, Saline, MI (US); Joseph S. VanSelous, Highland, MI (US); Daniel A. Bihn, Canton, MI (US)

(73) Assignee: Ricardo, Inc., Van Buren Township, MI (US)

( * ) Notice: Subject to any disclaimer, the term of this patent is extended or adjusted under 35 U.S.C. 154(b) by 237 days.

(21) Appl. No.: 13/919,160

(22) Filed: Jun. 17, 2013

(65) Prior Publication Data

US 2014/0366665 A1 Dec. 18, 2014

(51) Int. Cl.
F16D 23/02 (2006.01)
F16H 3/00 (2006.01)
F16D 23/06 (2006.01)
F16H 55/17 (2006.01)

(52) U.S. Cl.
CPC .............. *F16D 23/025* (2013.01); *F16D 23/06* (2013.01); *F16H 3/006* (2013.01); *F16D 2023/0631* (2013.01); *F16D 2023/0637* (2013.01); *F16H 2055/178* (2013.01); *F16H 2200/0069* (2013.01); *F16H 2200/0086* (2013.01); *F16H 2306/48* (2013.01); *Y10T 74/19228* (2015.01)

(58) Field of Classification Search
CPC .................. F16D 23/02; F16D 23/025; F16D 2023/0631; F16D 2023/2023; F16D 2023/0637; F16D 2023/0681; F16D 23/06; Y10T 74/19284; F16H 3/093; F16H 3/006; F16H 2200/0069; F16H 2200/0086; F16H 2055/178; F16H 2306/54; F16H 2306/48; F16H 2708/16

USPC ........... 74/321–323, 329, 330, 334, 335, 339; 192/53.31, 53.341, 53.32

See application file for complete search history.

(56) References Cited

U.S. PATENT DOCUMENTS

| | | | | |
|---|---|---|---|---|
| 1,225,144 | A * | 5/1917 | Land | 192/20 |
| 3,780,840 | A * | 12/1973 | Thomas | 192/48.91 |
| 5,785,162 | A * | 7/1998 | Barksdale | 192/53.331 |
| 7,121,393 | B1 * | 10/2006 | Skipper et al. | 192/48.91 |
| 8,105,203 | B2 | 1/2012 | Ishii et al. | |
| 8,333,272 | B2 | 12/2012 | Wheals et al. | |
| 9,010,207 | B2 * | 4/2015 | Ukon et al. | 74/371 |
| 2012/0211320 | A1 * | 8/2012 | Neto | 192/53.3 |

FOREIGN PATENT DOCUMENTS

WO 2010100280 9/2010

* cited by examiner

Primary Examiner — William Kelleher
Assistant Examiner — Bobby Rushing, Jr.
(74) Attorney, Agent, or Firm — Warner Norcross and Judd LLP

(57) ABSTRACT

A dual clutch transmission (DCT) with double-range change. In one embodiment, the dual clutch transmission includes odd and even lay shafts and a separate range change shaft for each, thereby providing a range change for both the odd and even gear sets. The input shaft may include an extension gear that can be selectively driven by the inner input shaft or the outer input shaft to provide additional gear pairings. The extension gear may include a synchronizer on each face to allow it to be coupled to either the outer or inner input shaft. The transmission may include a reverse shaft coupled with the even lay shaft. The transmission may include a dual half synchronizer having a single hub and a split sleeve. The parts of the split sleeve are separately movable to allow independent synchronization of two pairs of rotating components.

6 Claims, 19 Drawing Sheets

SHIFT RAILS

| GEAR | A<br>RC-1 | B<br>5,10 | C<br>1-7/3-9 | D<br>REV | E<br>2-6/4-8 | F<br>RC-2 |
|---|---|---|---|---|---|---|
| 10TH | X' | X | | | | |
| 9TH | X' | | X' | | | |
| 8TH | | | | | X | X' |
| 7TH | X' | | X | | | |
| 6TH | | | | | X' | X' |
| 5TH | X | X' | | | | |
| 4TH | | | | | X | X |
| 3RD | X | | X' | | | |
| 2ND | | | | | X' | X |
| 1ST | X | | X | | | |
| HIGH REV | | | | X | | X' |
| LOW REV | | | | X | | X |

Fig. 5

ENHANCED DUAL CLUTCH TRANSMISSION

BACKGROUND OF THE INVENTION

The present invention relates to transmissions, and more particularly to dual clutch transmissions.

Dual clutch transmissions (DCTs) are well known and include two clutches arranged so that the transmission can transfer drive from one gear ratio to another without interrupting the torque transmitted to the output drive. A typical dual clutch transmission uses two separate clutches and two separate input shafts for odd and even gear sets or gears connected to the inner input shaft and those connected to the outer input shaft. This allows an odd gear set to be "pre-selected" while an even gear set is in use, or an even gear set to be pre-selected while an odd gear set is in use or transmitting torque to the ground. When it is time to shift to the pre-selected gear any time after the torque and speed have been transferred to the opposite clutch, the engaged clutch can be disengaged, and the disengaged clutch can be engaged, thereby shifting without torque interrupt. The clutch "handover" of a conventional DCT provides a smooth transition between sequential gears without loss of power.

DCTs have provided a number of improvements over conventional manual and automatic transmissions. For example, use of a multiple-plate clutch assembly avoids inefficiencies associated with torque converters commonly found in automatic transmissions. DCTs are typically lighter than comparable automatic transmissions, and can provide improved fuel economy and quicker shift periods than a comparable manual transmission. Although DCTs provide a marked improvement in many respects over other types of transmission, DCTs can be difficult to implement and to package within the tight space constraints associated with today's vehicle design. This is particularly true in applications where a larger number of transmission speeds are desired.

Synchronizers are also well known and are included on many DCTs and in a variety of configurations. For example, some synchronizers are configured to engage only a single gear (i.e., a half synchronizer) and have one neutral position and one engaged position. Other synchronizers are configured to engage one of two gears (i.e., a dual synchronizer) and have one neutral position and two engaged positions. In some transmission configurations it can be desirable to simultaneously engage two gears. In these configurations, two half synchronizers are generally positioned back to back along the same shaft, each being controlled by a separate shift fork. The inclusion of two synchronizers adds bulk to the overall transmission assembly, however, and can be difficult to implement in DCTs and in single clutch transmissions.

SUMMARY OF THE INVENTION

The present invention provides a dual clutch transmission (DCT) with double-range change that facilitates increased gears with limited impact on transmission packaging. In one embodiment, the dual clutch transmission includes odd and even lay shafts and a separate range change shaft for each, thereby providing a range change for both the odd and even gear sets. The odd range change shaft may be arranged to selectively couple the inner and outer shafts of the odd lay shaft to vary the gear ratio. Similarly, the even range change shaft may be arranged to selectively couple the inner and outer shafts of the even lay shaft to vary the gear ratio.

In one embodiment, the input shaft includes an extension gear that can be selectively driven by the inner input shaft or the outer input shaft to provide additional gear pairings. In one embodiment, the extension gear is selectively coupled to the inner shaft, the odd lay shaft and the odd range change shaft to provide $5^{th}$ gear. In one embodiment, the extension gear is selectively coupled to the outer shaft and the odd lay shaft to provide $10^{th}$ gear. The extension may include a synchronizer on each face to allow it to be coupled to either the outer or inner input shaft.

In one embodiment, the reverse shaft is interconnected with the even lay shaft, rather than the odd lay shaft. This allows pre-selection and clutch handover between reverse and $1^{st}$ gear.

In one embodiment, the present invention may include a control system that utilizes a single motor to alternately supply hydraulic fluid for operating the double-range DCT or lubricating fluid for cooling the double-range DCT. In one embodiment, the motor drives a hydraulic fluid pump when rotating in one direction and drives a lubricating fluid pump when rotating in the reverse direction. In some embodiments, the drive clutch and the shift rails are operating using hydraulic fluid. In such embodiments, the hydraulic fluid motivated by the hydraulic fluid pump may be used to operate the drive clutch and/or the shift rails.

In one embodiment, an improved dual half synchronizer is provided. The dual half synchronizer includes a synchronizer hub and first and second shift sleeves mounted about the synchronizer hub. The first shift sleeve is moveable in a first axial direction from a retracted position to an extended position, and the second shift sleeve is moveable in a second axial direction from a retracted position to an extended position. The shift sleeves can sequentially or simultaneously engage first and second gears positioned on opposite sides of the synchronizer hub while introducing space savings within a transmission, optionally a dual clutch transmission.

In one embodiment, the first and second shift sleeves include axial projections that are radially offset from each other. The axial projections interfit with each other when the first and second shift sleeves are in the retracted position. The axial projections are optionally complementary castellations that circumferentiate the synchronizer. Further optionally, the synchronizer hub includes a plurality of stops to limit axial movement of the first and second shift and to generally prevent the shift sleeves from interacting with each other.

The present invention provides for the implementation of a dual clutch transmission with an increased number of gears in an efficient and practical manner. The double-range DCT is readily implemented without a dramatic increase in transmission size or configuration. The present invention may include an extension gear that can be coupled to either the inner or outer input shaft, thereby allowing use of one output shaft system rather than two. The present invention may be implemented in DCT transmissions with different speeds, such as a 10-speed transmission or a 12-speed transmission. In use, the double-range DCT can provide progressive ratio steps and geometric progression. Further, $1^{st}$ gear and reverse can be organized on opposite clutches to facilitate shifting between $1^{st}$ and reverse, which can be useful in allowing an operator to rock the vehicle in snow, ice or mud while stuck in a dip.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5 is a shift rail chart for the double-range DCT.

DESCRIPTION OF THE CURRENT EMBODIMENT

Overview.

Figure 1:
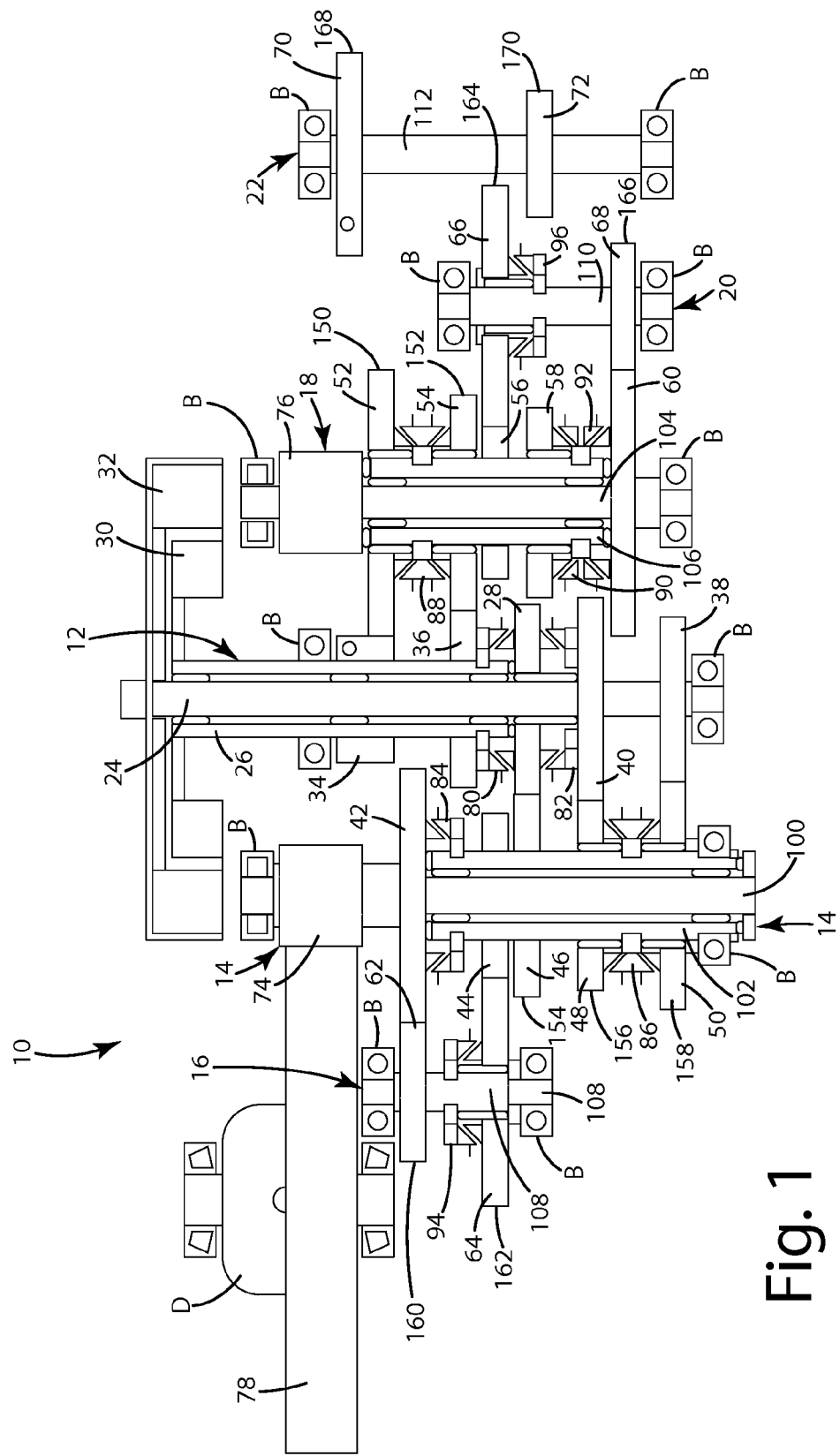
FIG. 1 is a schematic representation of a double-range DCT in accordance with an embodiment of the present invention.

A double-range dual clutch transmission ("DCT") is schematically shown in FIG. 1, and generally designated 10. The double-range DCT 10 generally includes an input shaft 12, an odd lay shaft 14, an odd range change shaft 16, an even lay shaft 18, an even range change shaft 20 and a reverse shaft 22. The input shaft 12 includes an inner shaft 24 and an outer shaft that can be selectively coupled to the engine output (not shown) by an inner clutch 30 and an outer clutch 32. The odd and even range change shafts 16 and 20 are selectively engageable to provide the DCT with additional gear ratios. More specifically, the odd range change shaft 16 can be selectively engaged with the odd lay shaft 18 to add a second range to select odd gear pairings. Similarly, the even range change shaft 20 can be selectively engaged with the even lay shaft 18 to add a second range to select even gear pairings. The input shaft 12 includes inner shaft 24 and outer shaft 26, as well as an extension gear 28 that can be selectively engaged with the inner shaft 24 or the outer shaft 26 using a synchronizer to provide the DCT 10 with additional gear ratios. The double-range DCT 10 may include a control system that utilizes a single motor to alternately supply hydraulic fluid or lubricating fluid. In one embodiment, the motor drives a hydraulic fluid pump when rotating in one direction and drives a lubricating fluid pump when rotating in the reverse direction. The double-range DCT 10 of the illustrated embodiment uses a plurality of full and half synchronizers to select the desired gear ratios. The double-range DCT 10 may include a reduced-width synchronizer having nested sleeves that can expand during engagement.

A double-range DCT in accordance with the present invention may be incorporated into a wide variety of drive trains (or powertrains) that utilize a multi-speed transmission. Although not shown, the present invention is intended primarily for use as a transmission in the drive train of a vehicle, such as a high performance automobile, but it may be used in other application. In a typical automobile application, the double-range DCT will be incorporated into the vehicle between the engine and the differential. More specifically, the double-range DCT is coupled to the output of the engine and the input gear of the differential. In use, the double-range DCT translates engine output into the desired differential input. Using a variety of alternative combinations of gear pairings, the double-range DCT is capable of providing power to the differential within different speed/torque ranges.

Figure 2:
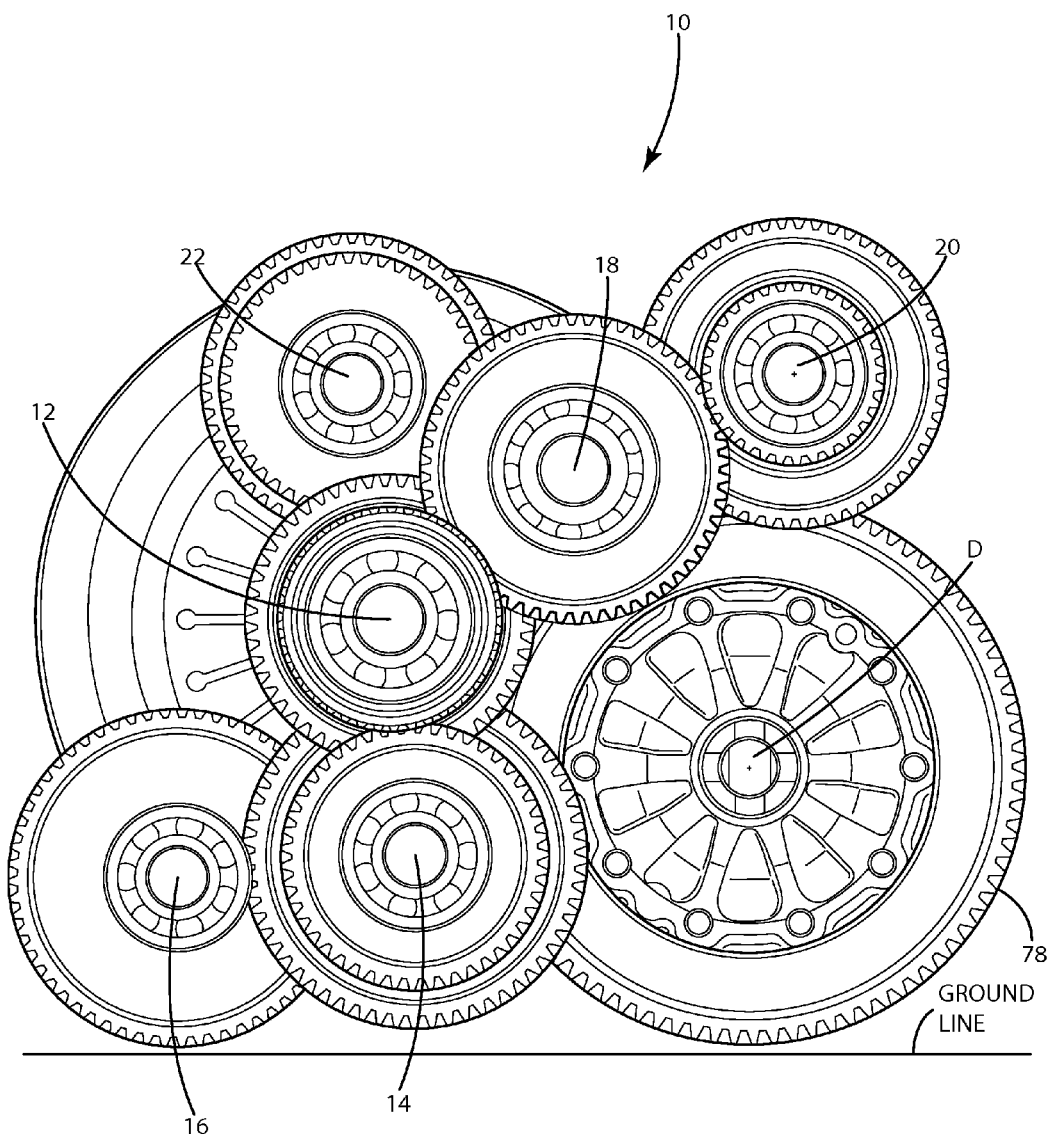
FIG. 2 is a perspective view of the double-range DCT.
Figure 3:
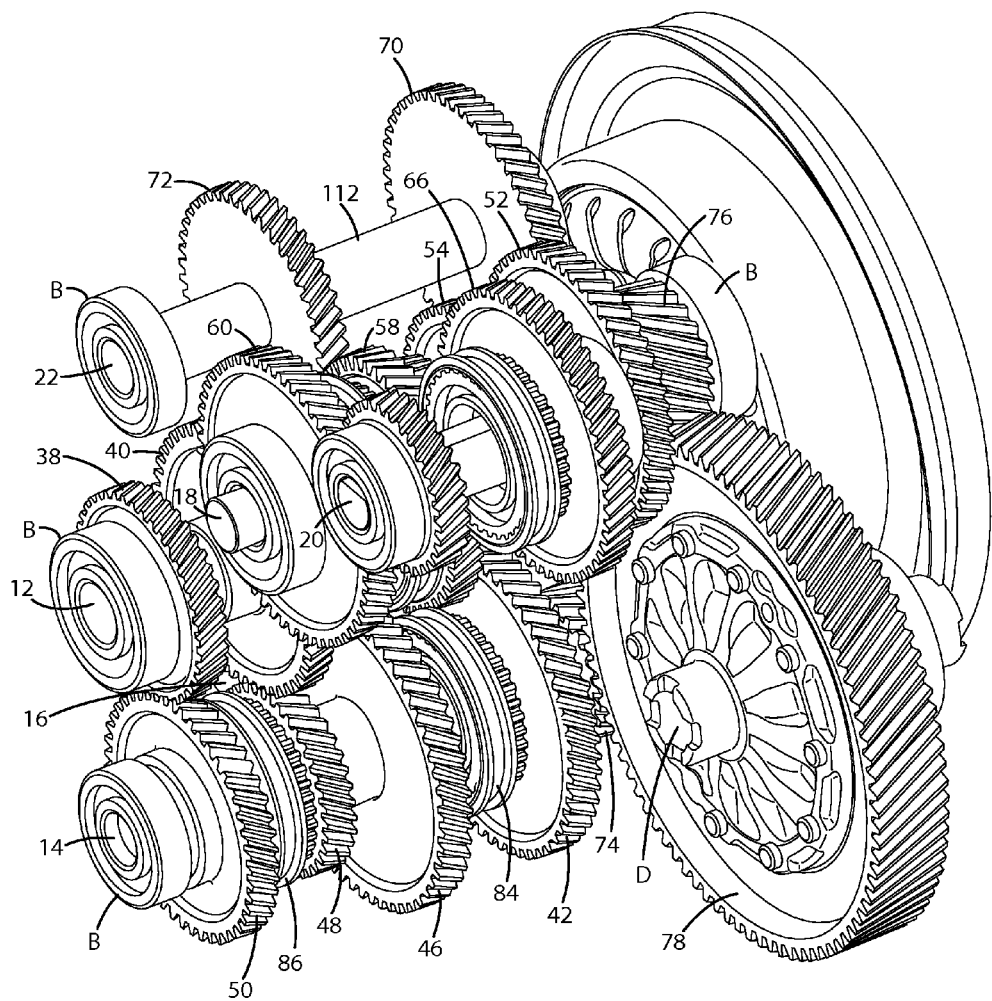
FIG. 3 is an end view of the double-range DCT.

It should be noted that various figures include schematic representations of the transmission 10 in which the components are depicted and arranged in a manner intended to facilitate an understanding of the interrelationship of the components, including the interaction of the shafts and various gear pairings. To implement the present invention, the transmission components may be disposed in a variety of alternative arrangements. FIGS. 2 and 3 are perspective and end views of transmission 10 intended to provide a representation of the respective positions of the various shafts and gears in one embodiment. The arrangement illustrated in FIGS. 2 and 3 is merely exemplary. As can be seen, in this embodiment, none of the shafts/gears extend below the ground line defined by the lowermost point of the differential D. Further, the range change shafts and reverse shaft have little impact on the overall height and width of the transmission and differential.

Construction.

As noted above, the double-range DCT 10 of FIG. 1 generally includes an input shaft 12, an odd lay shaft 14, an odd range change shaft 16, an even lay shaft 18, an even range change shaft 20 and a reverse shaft 22. The input shaft 12 has inner and outer shafts 24, 26 that can be selectively coupled to the engine (not shown) by a dual clutch. The dual clutch has an outer clutch 32 for selectively coupling the inner shaft 24 to the engine, and an inner clutch 30 for selectively coupling the outer shaft 26 to the engine. The input shaft 12 is coupled to the odd lay shaft 14 and the even lay shaft 18 by a variety of different gear pairings (as described below). The various shafts 12, 14, 16, 18, 20 and 22, as well as differential D, are supported by appropriate bearings B. For example, in the embodiment of FIG. 1, the odd lay shaft 14, the odd range change shaft 16, even lay shaft 18, even range change shaft 20 and reverse shaft 22 are supported at opposite ends by bearing B, and input shaft 12 include an end bearing B and an intermediate bearing B. FIGS. 2 and 3 are perspective and end views of the double-range DCT 10 showing the various shafts and gear pairings of one embodiment. As can be seen, in the illustrated embodiment, the lay shafts 14 and 18 are generally disposed between the input shaft 12 and the input gear 78 of the differential D. The range change shafts 14 and 18 are generally disposed somewhat outside the lay shafts 14 and 18 where they are capable of interacting with the lay shafts 14 and 18 without inferring with other elements of the double-range DCT 10. The reverse shaft 22 is generally disposed adjacent to the input shaft 12 and the even lay shaft 18 as it is directly engaged with both.

Although the lay shafts 14 and 18 are referred to as "odd" and "even" lay shafts, that is merely an expedient and these shafts need not be associated exclusively with "odd" or "even" speeds. For example, in the embodiment shown in FIG. 1, the odd lay shaft 14 (rather than the even lay shaft 18) is employed when the DCT 10 is operating in $10^{th}$ speed.

Referring now to FIGS. 1-3, the DCT 10 includes a variety of gear pairs that are in constant engagement with one another and are selectively joined to the torque path depending on the gear of operation. Gears 34 and 52 form gear pair 150, which is part of the torque path in $2^{nd}$ and $6^{th}$ gears. Gears 36 and 54 form gear pair 152, which is part of the torque path in $4^{th}$ and $8^{th}$ gears. Gears 28 and 46 form gear pair 154, which is part of the torque path in $5^{th}$ and $10^{th}$ gears. Gears 40 and 48 form gear pair 156, which is part of the torque path in $3^{rd}$ and $9^{th}$ gears. Gears 38 and 50 form gear pair 158, which is part of the torque path in $1^{st}$ and $7^{th}$ gears. Gears 42 and 62 form gear pair 160, which is part of the torque path for $1^{st}$, $3^{rd}$ and $5^{th}$. Gears 44 and 64 form gear pair 162, which is part of the torque path for $1^{st}$, $3^{rd}$ and $5^{th}$. Gears 56 and 66 form gear pair 164, which is part of the torque path for $2^{nd}$, $4^{th}$ and low range reverse gears. Gears 60 and 68 form gear pair 166, which is part of the torque path for $2^{nd}$, $4^{th}$ and low range reverse gears. Gears 34 and 70 form gear pair 168, which is part of the torque path for low range reverse gear and high range reverse gear. Gears 58 and 72 form gear pair 170, which is part of the torque path for low range reverse gear and high range reverse gear.

The double-range DCT 10 also includes a plurality of synchronizers that are operable to move the DCT 10 through its various speeds. More specifically, the synchronizers allow select combinations of gear pairs to be joined into the torque flow path to set the DCT 10 in the desired speed. In the illustrated embodiment, the input shaft 12 includes two half synchronizers 80 and 82 that allow extension gear 28 to be joined to gear 40 on inner shaft 24 or to gear 36 on outer shaft 26. Odd lay shaft 14 includes half synchronizer 84 for selectively joining outer shaft 102 to hear 42, and synchronizer for selectively joining outer shaft 102 to gear 48 or gear 50. Even lay shaft 18 includes synchronizer 88 for selectively joining outer shaft 106 to gear 52 or gear 54. Even lay shaft 18 also includes a dual half synchronizer that includes integrated, but separately operable, half synchronizers 90 and 92 (described in more detail below). Half synchronizer 90 is capable of selectively joining outer shaft 106 to gear 58. Half synchronizer 92 is capable of selectively joining outer shaft 106 to gear 60. Odd range change shaft 16 includes synchronizer 94 for selectively joining shaft 108 to gear 64. And finally, even range change shaft 20 includes synchronizer 96 for selectively joining shaft 110 to gear 66.

The double-range DCT 10 of the present invention may include a generally conventional DCT control system (not shown) modified to accommodate the variations of the present invention as set forth in this description. Given that the present invention may incorporate a generally conventional control system, the control system will not be described in detail. In one embodiment, the control systems includes a plurality of shift rails A-F and shift forks (not shown) for operating the synchronizers 80, 82, 84, 86, 88, 90, 92, 94 and 96 as desired to shift between different transmission speeds. Operation of the shift rails A-F and shift forks may be automated using a computer control (not shown). For example, a computer control may operate a hydraulic, pneumatic, electric or other type of actuation system that moves the shift rails A-F, and consequently the shift forks, as needed to control operating the transmission. The design, configuration and operation of shift rails, shift forks and associated control systems are well known and will not be described in detail. The computer control (not shown) may also control operation of the drive clutches, including the timing and manner of engagement and disengagement of inner clutch 30 and outer clutch 32. A variety of torque handover control methods are known and will not be addressed in this description. Suffice it to say that the computer controller may implement essentially any control methodology capable of providing adequate torque handover from one clutch to the other.

The double-range DCT 10 may incorporate the hydraulic control system shown in U.S. patent Ser. No. 13/576,949, entitled HYDRAULIC CONTROL SYSTEM FOR A DUAL CLUTCH TRANSMISSION, which was filed on Aug. 29, 2012, and is incorporated herein by reference in its entirety. This hydraulic control system provides a simple and effective system capable of providing hydraulic pressure to operate the transmission and providing lubricating fluid for cooling the transmission. In one embodiment of this hydraulic control system, the system includes a single motor that can be operated in one direction to operate a pump that supplies a flow of hydraulic fluid and operated in a second direction to operate a separate pump that supplies a flow of lubricating fluid. The hydraulic fluid supplied by the hydraulic fluid pump may be used to operate the shift rails and/or the drive clutches, among other things. The lubricating fluid supplied by the lubricating fluid pump may be supplied to the drive clutch and/or the working parts of the transmission, such as the gear pairs and the synchronizers.

Figure 4:
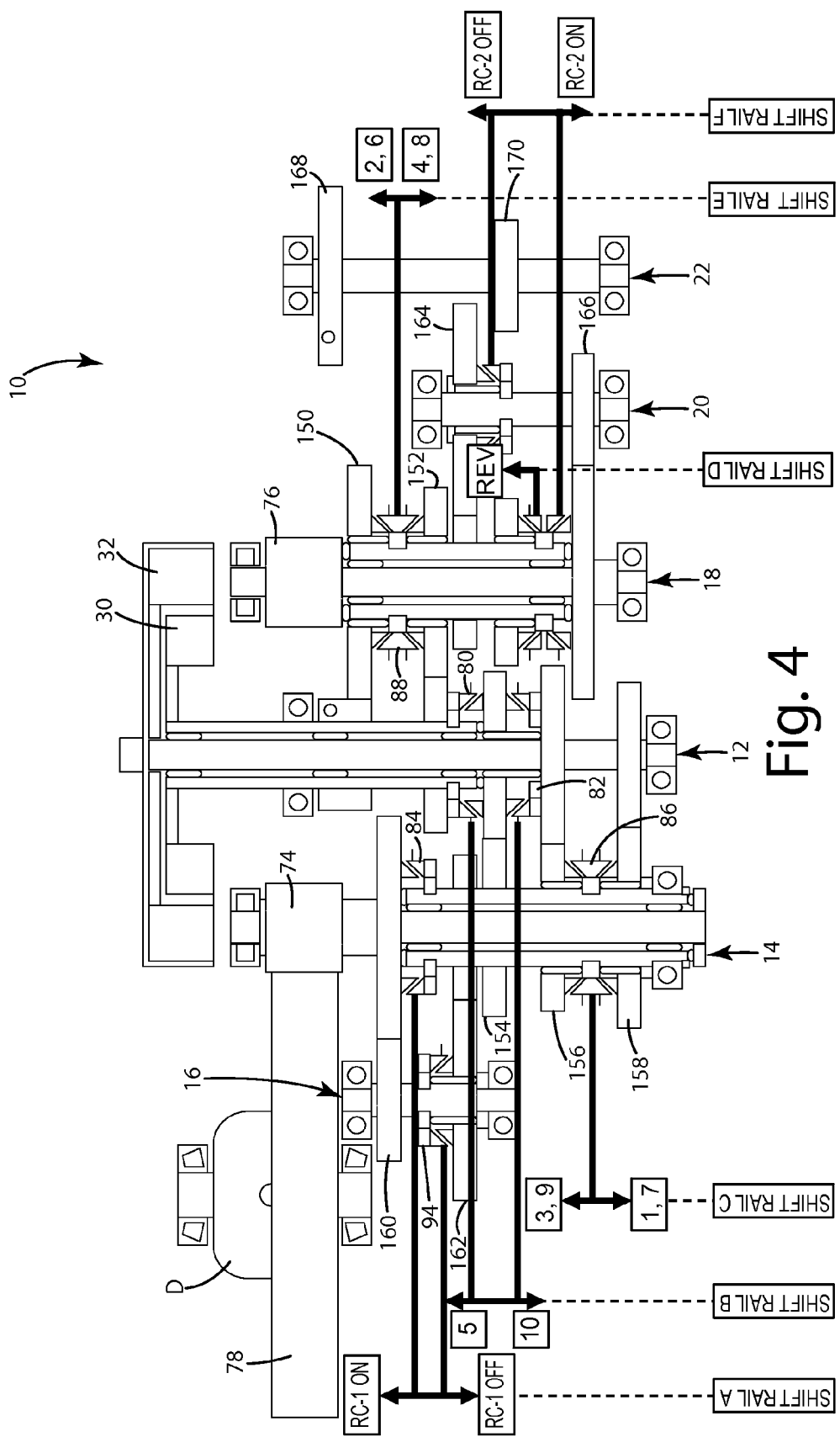
FIG. 4 is a schematic representation of the double-range DCT annotated to assist in describing the shift rails.
Figure 6:
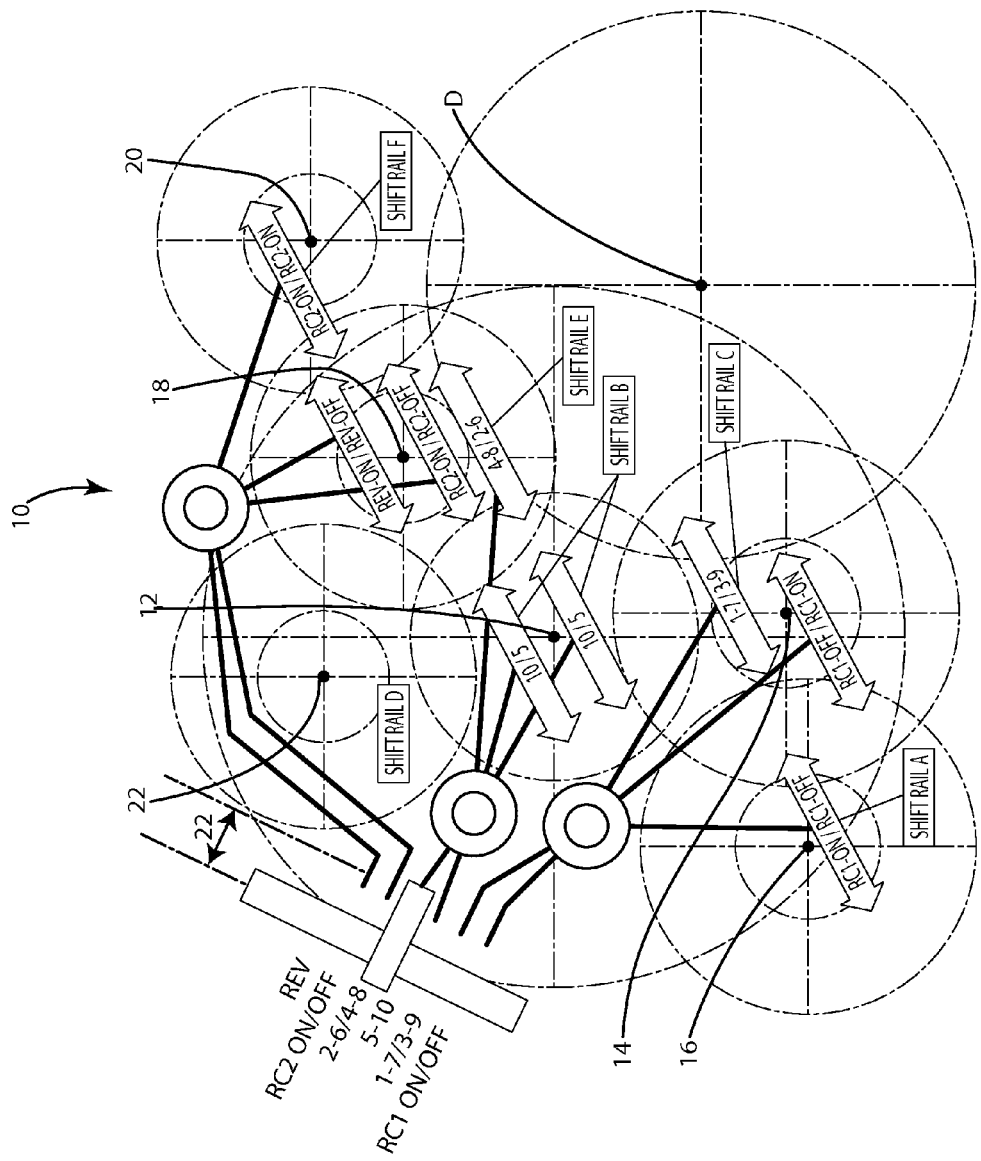
FIG. 6 is a schematic end view of the double-range DCT.

FIGS. 4 and 6 are schematic representations of the double-range DCT 10 illustrating the shift rails A-F and their operation. As shown, the double-range DCT 10 generally includes six shift rails, each assigned a letter designation, namely, shift rails A-F. FIG. 5 is a table showing the status of the shift rails A-F by transmission speed. In this table, "X" represents movement of the shift rail in one direction and "X'" represents movement of the shift rail in the opposite direction. The table presents shift rail positions required to implement the torque flow path for a specific transmission speed. The table does not provide information relating to the position of shift rails outside of the torque flow path. Shift rail A is coupled to synchronizer 84 on odd lay shaft 14 and synchronizer 94 on odd range change shaft 14. When moved in one direction, shift rail A engages synchronizer 94 to couple gear 64 to shaft 108, which engages the odd range change shaft 14 as needed for $1^{st}$, $3^{rd}$ and $5^{th}$ gears. When moved in the opposite direction, shift rail A engages synchronizer 84 to couple gear 42 to outer shaft 102 ($7^{th}$, $9^{th}$ and $10^{th}$ gears). Shift rail B is coupled to synchronizer 80 and synchronizer 82, both on input shaft 12. When moved in one direction, shift rail B engages synchronizer 82 to couple extension gear 28 to gear 40, which effectively joins extension gear 28 to inner shaft 24 ($5^{th}$ gear). When moved in the opposite direction, shift rail B engages synchronizer 80 to couple extension gear 28 to gear 36, which effectively joins extension gear 28 to outer shaft 26 ($10^{th}$ gear). Shift rail C is coupled to synchronizer 86 on odd lay shaft 14. When moved in one direction, shift rail C engages synchronizer 86 to couple outer shaft 102 to gear 48 ($3^{rd}$ and $9^{th}$ gears). When moved in the opposite direction, shift rail C engages synchronizer 86 to couple outer shaft 102 to gear 50 ($1^{st}$ and $7^{th}$ gears). Shift rail D is coupled to synchronizer 90 on even lay shaft 18. When moved in one direction, shift rail D engages synchronizer 90 to couple gear 58 to outer shaft 106, which effectively joins the reverse shaft 22 to the even lay shaft 18 (low range reverse and high range reverse gears). Shift rail E is coupled to synchronizer 88 on even lay shaft 18. When moved in one direction, shift rail E is engaged to couple gear 52 to outer shaft 106 ($2^{nd}$ and $6^{th}$ gears). When moved in the opposite direction, shift rail E is engaged to couple gear 54 to outer shaft 106 ($4^{th}$ and $8^{th}$ gears). Shift rail F is coupled to synchronizer 92 on even lay shaft 18 and synchronizer 96 on even range change shaft 20. When moved in one direction, shift rail F engages synchronizer 96 to couple gear 66 to shaft 110, which effectively engages the even range change shaft 20 ($2^{nd}$, $4^{th}$ and low range reverse gears). When moved in the opposite direction, shift rail F engages synchronizer 92 to couple gear 60 to outer shaft 106, which effectively joins the inner shaft 104 and outer shaft 106 of the even lay shaft 18 ($6^{th}$, $8^{th}$ and high range reverse gears).

Operation of Double-Range DCT.

As discussed above, one of the primary benefits of a DCT is that it allows one gear set to be preselected while another gear set is in use. More specifically, a typical DCT generally allows odd gears to be preselected while an even gear is in use, and even gears to be preselected while an odd gear is in use. As a result, a DCT generally allows a smooth and quick transition from one gear to the next. For example, when sequentially shifting from one gear to the next (up or down), the DCT control system will typically be capable of preselecting each subsequent gear. There are a variety of known methods for allowing a transmission controller to accurately predict and preselect the next gear. These methods are beyond the scope of this disclosure and therefore will not be described in any detail.

Figure 7A:
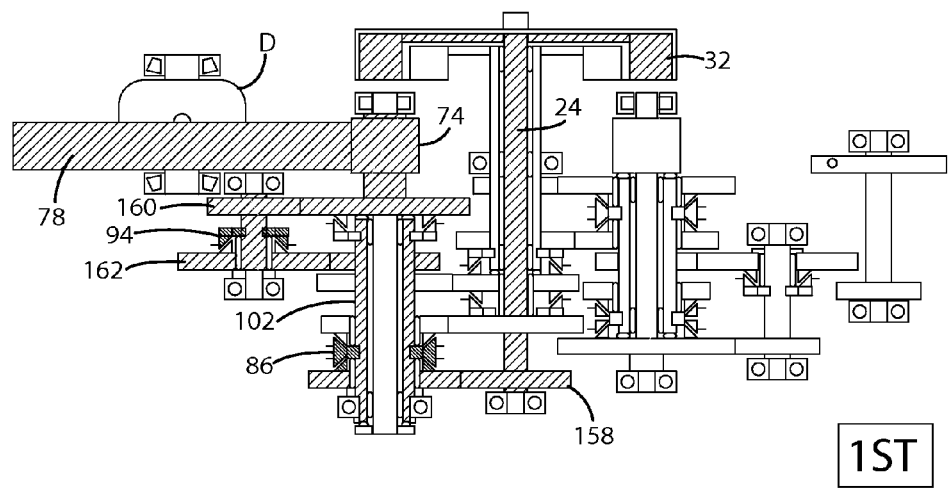
FIGS. 7A-7L are schematic representations of the double-range DCT annotated to show the torque flow path in each of the different gears.
Figure 7B:
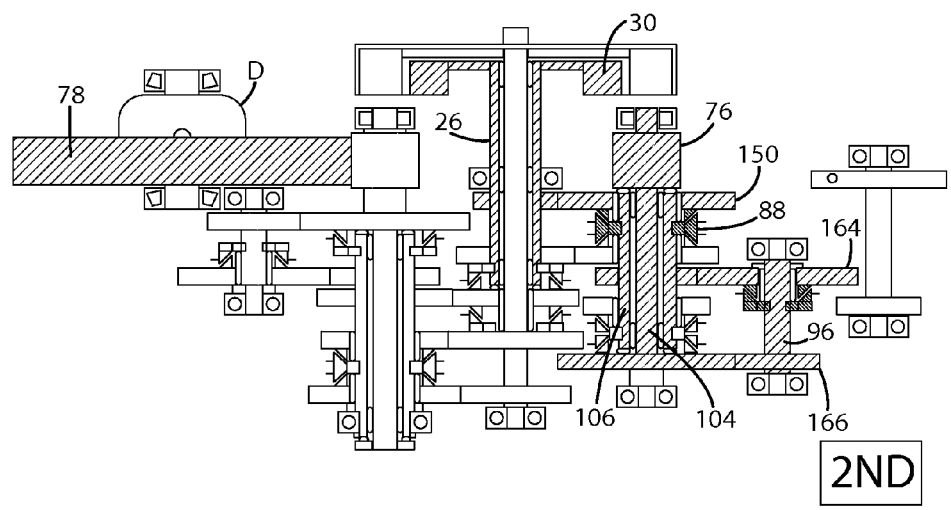
Figure 7C:
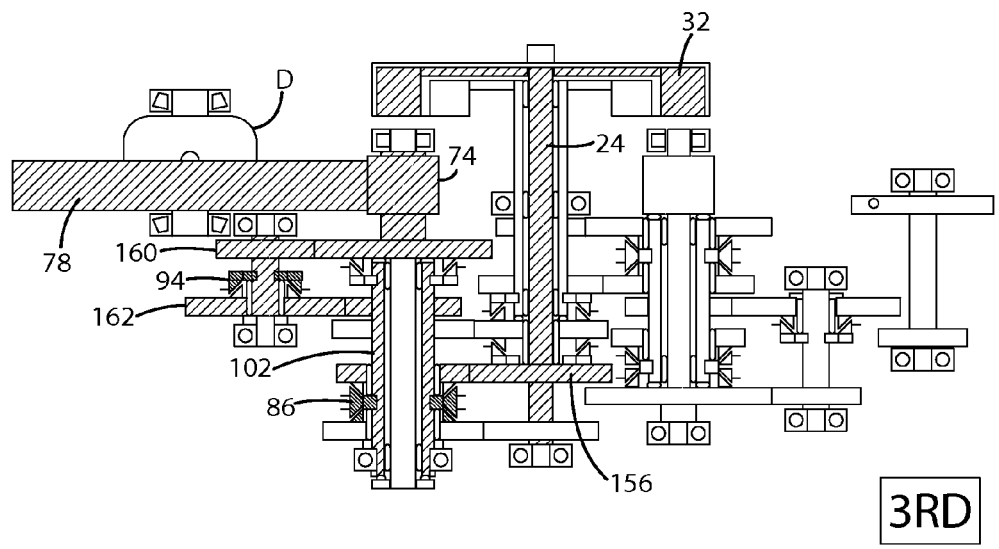
Figure 7D:
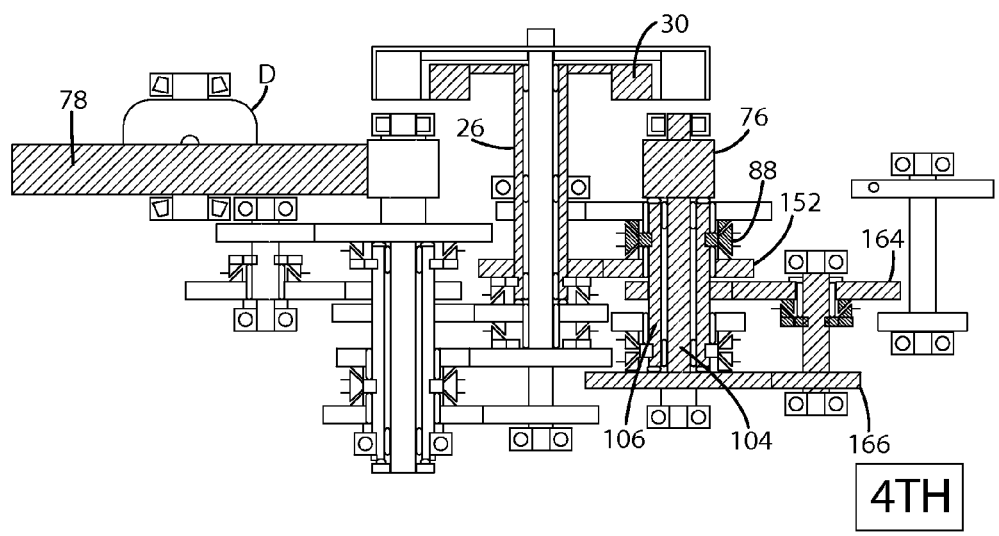
Figure 7E:
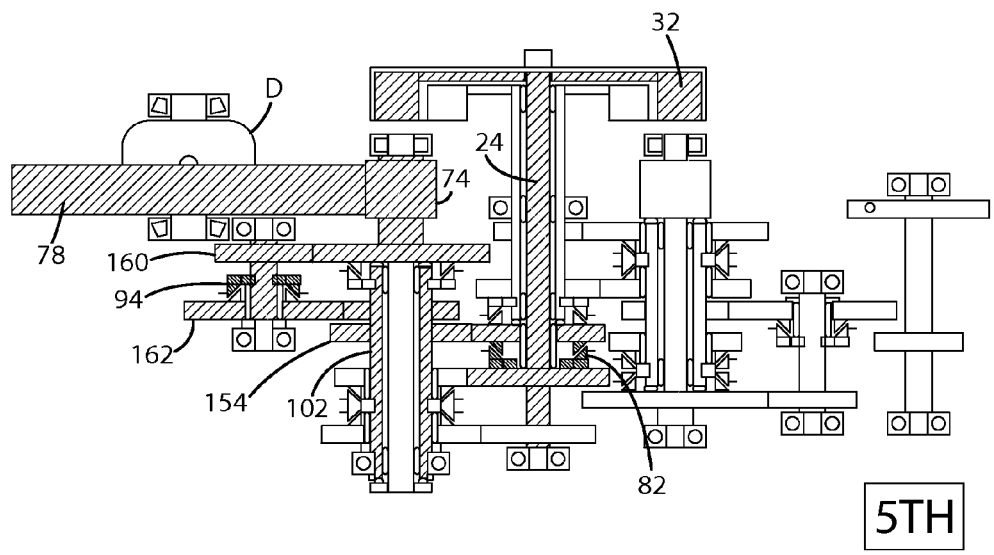
Figure 7F:
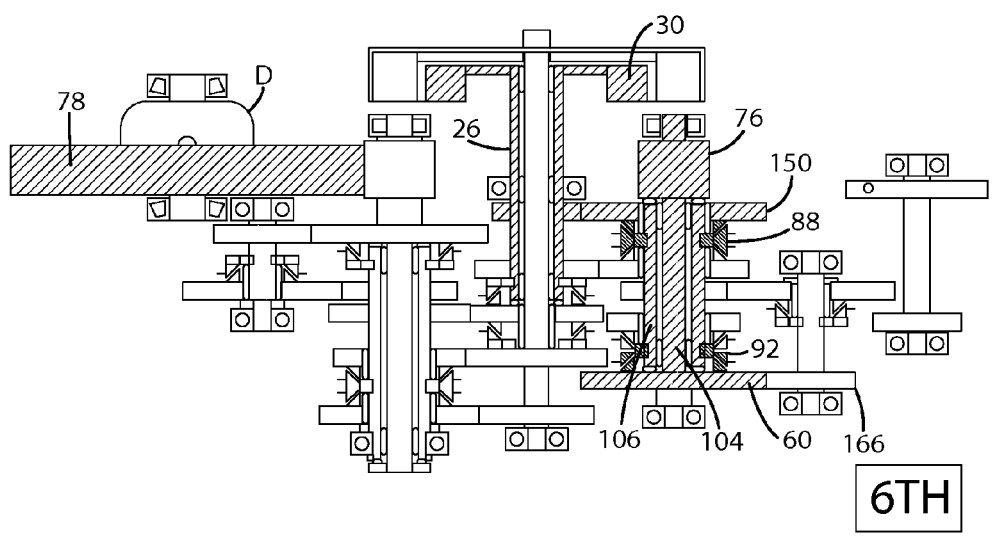
Figure 7G:
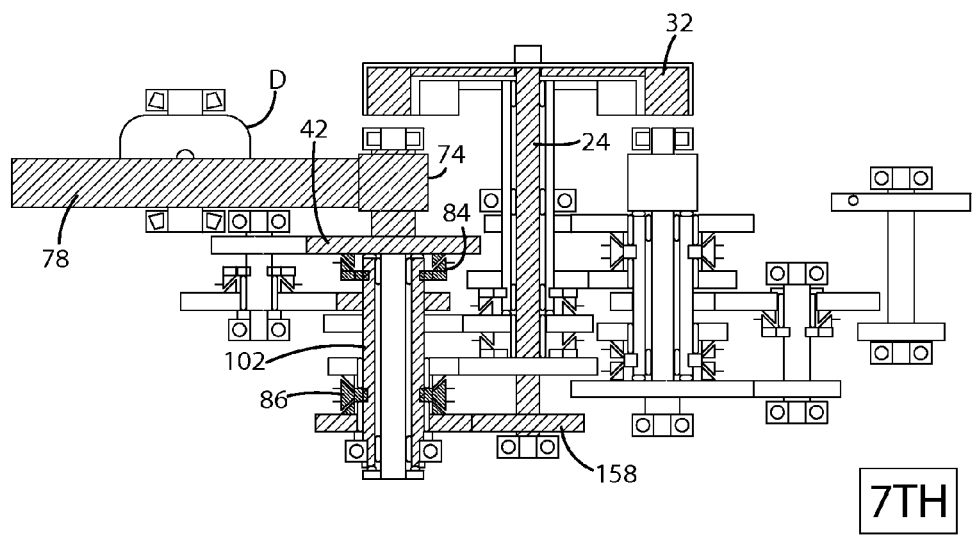
Figure 7H:
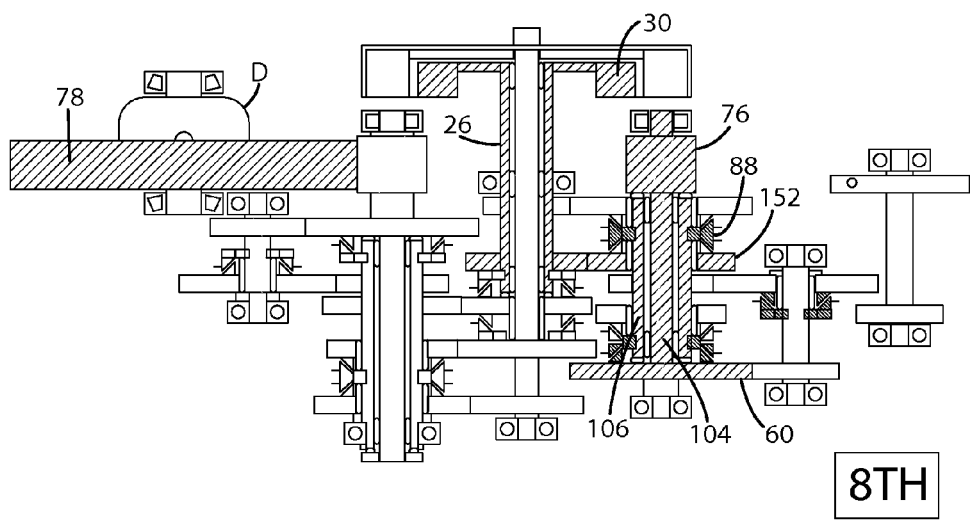
Figure 7I:
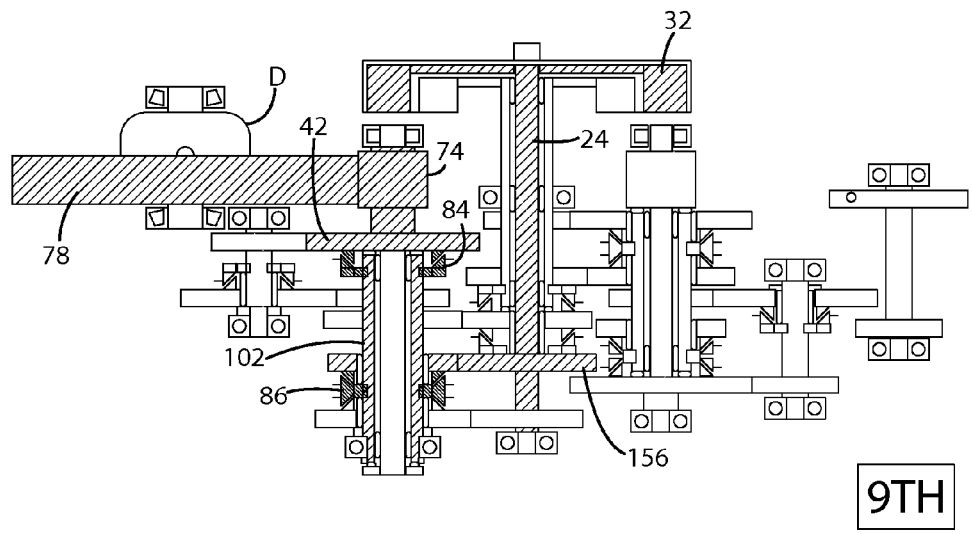
Figure 7J:
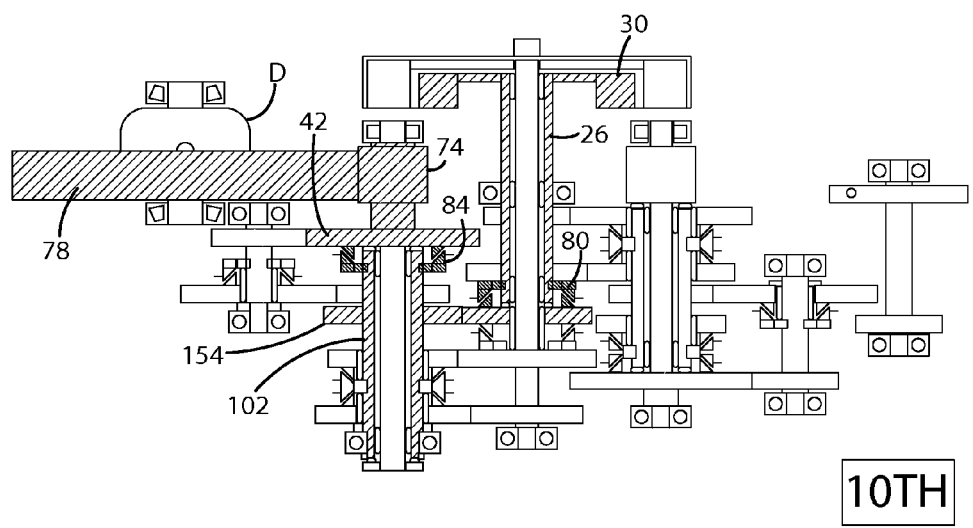
Figure 7K:
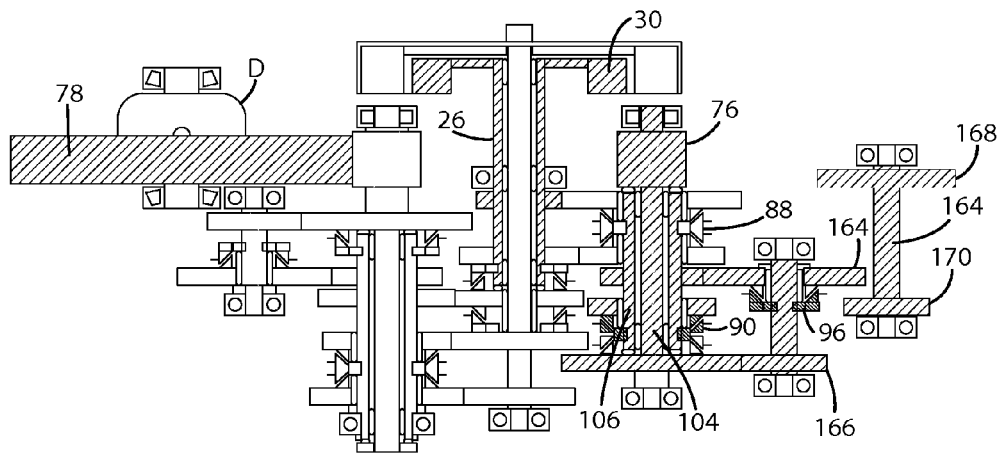
Figure 7L:
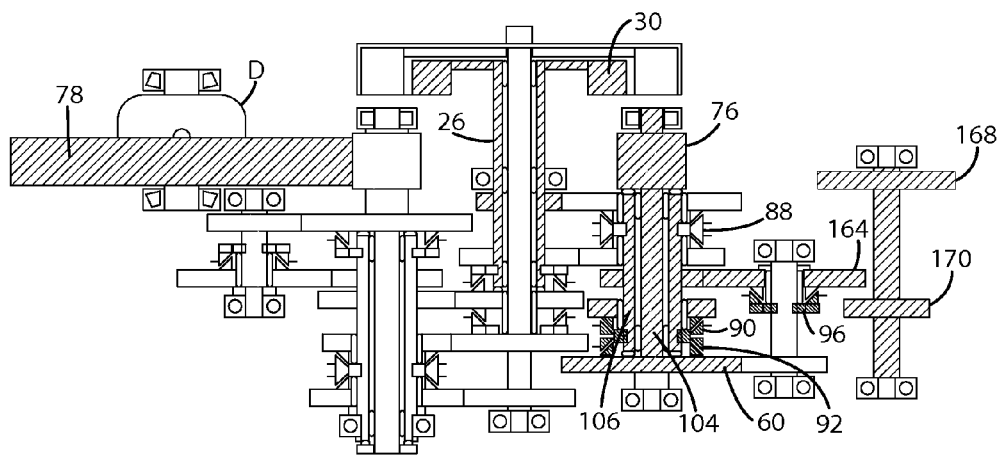

To facilitate an understanding of the general operation of the double-range DCT 10, the torque flow paths and the pre-selection processes will now be described in connection with FIGS. 7A-L. FIGS. 7A-L are schematic representations of the DCT 10 in each of its ten speeds plus high and low reverse gears. The shaded elements of the transmission in each figure show the interconnections of the transmission components, and consequently the torque flow path, for that speed. For purposes of disclosure, we will begin our description with the DCT 10 in $1^{st}$ gear. Referring now to FIG. 7A, in $1^{st}$ gear, outer clutch 32 is engaged to drive inner shaft 24. Gear 38 on inner shaft 24 is engaged with gear 50 on odd lay shaft 14 (collectively, gear pair 158). Synchronizer 86 is engaged to join gear 38 with outer shaft 102. Gear 44 is engaged with gear 64 of range change shaft 16 (collectively, gear pair 162), and synchronizer 94 is engaged to join gear 64 to shaft 108. Gear 64 is coupled to gear 62 by shaft 108. Gear 62 is engaged with gear 42 (collectively, gear pair 160). Gear 42 is fixed to inner shaft 100 and consequently to gear 74. Gear 74 is engaged with input gear 78 on differential D. As can be seen, the torque path is from the input shaft 12 to the odd lay shaft 14, the odd range change shaft 16, back to the odd lay shaft 14 and finally to the differential D.

To preselect $2^{nd}$ gear, synchronizer 96 is first operated to couple gear 66 to shaft 110 and then synchronizer 88 is operated to couple gear 52 to shaft 106. When it is time to shift from $1^{st}$ gear to $2^{nd}$ gear, the outer clutch 32 is disengaged and the inner clutch 30 is engaged. In $2^{nd}$ gear, outer shaft 26 is coupled to and drives gear 34 (See FIG. 7B). Gear 34 is engaged with gear 52 of even lay shaft 18 (collectively, gear pair 150). Gear 52 is coupled to shaft 106 by synchronizer 88. Gear 52 is coupled to gear 56 by shaft 106. Gear 56 is engaged with gear 66 of even range change shaft 20 (collectively, gear pair 164). Gear 66 is coupled to shaft 110 by synchronizer 96 such that gear 66 is coupled to gear 68 by shaft 110. Gear 68 is engaged with gear 60 on even lay shaft 18 (collectively, gear pair 166). Gear 60 is coupled to gear 76 by shaft 104. Gear 76 is engaged with input gear 78 on differential D.

To preselect $3^{rd}$ gear, synchronizer 94 is first operated to couple gear 62 to shaft 108 and then synchronizer 86 is operated to couple gear 48 to shaft 102. When it is time to shift from $2^{nd}$ gear to $3^{rd}$ gear, the inner clutch 30 is disengaged and the outer clutch 32 is engaged. In $3^{rd}$ gear, inner shaft 24 is coupled to and drives gear 40 (See FIG. 7C). Gear 40 is engaged with gear 48 of odd lay shaft 14 (collectively, gear pair 156). Gear 48 is coupled to shaft 102 by synchronizer 86. Gear 48 is coupled to gear 44 by shaft 102. Gear 44 is engaged with gear 64 of odd range change shaft 16 (collectively, gear pair 162). Gear 64 is coupled to shaft 108 by synchronizer 94 such that gear 64 is coupled to gear 62 by shaft 108. Gear 62 is engaged with gear 42 on odd lay shaft 14 (collectively, gear pair 160). Gear 42 is coupled to gear 74 by shaft 100. Gear 74 is engaged with input gear 78 on differential D.

To preselect $4^{th}$ gear, synchronizer 96 is first operated to couple gear 66 to shaft 110 and then synchronizer 88 is operated to couple gear 54 to shaft 106. When it is time to shift from $3^{rd}$ gear to $4^{th}$ gear, the outer clutch 32 is disengaged and the inner clutch 30 is engaged. In $4^{th}$ gear, outer shaft 26 is coupled to and drives gear 36 (See FIG. 7D). Gear 36 is engaged with gear 54 of even lay shaft 18 (collectively, gear pair 152). Gear 54 is coupled to shaft 106 by synchronizer 88. Gear 54 is coupled to gear 56 by shaft 106. Gear 56 is engaged with gear 66 of even range change shaft 20 (collectively, gear pair 164). Gear 66 is coupled to shaft 110 by synchronizer 96 such that gear 66 is coupled to gear 68 by shaft 110. Gear 68 is engaged with gear 60 on even lay shaft 18 (collectively, gear pair 166). Gear 60 is coupled to gear 76 by shaft 104. Gear 76 is engaged with input gear 78 on differential D.

To preselect $5^{th}$ gear, synchronizer 94 is first operated to couple gear 62 to shaft 108 and then synchronizer 82 is operated to couple extension gear 28 to inner shaft 24. When it is time to shift from $4^{th}$ gear to $5^{th}$ gear, the inner clutch 30 is disengaged and the outer clutch 32 is engaged. In $5^{th}$ gear, inner shaft 24 is coupled to and drives extension gear 28 (See FIG. 7E). Extension gear 28 is engaged with gear 46 of odd lay shaft 14 (collectively, gear pair 154). Gear 46 is fixedly coupled to shaft 102. Gear 46 is coupled to gear 44 by shaft 102. Gear 44 is engaged with gear 64 of odd range change shaft 16 (collectively, gear pair 162). Gear 64 is coupled to shaft 108 by synchronizer 94 such that gear 66 is coupled to gear 62 by shaft 108. Gear 62 is engaged with gear 42 on odd lay shaft 14 (collectively, gear pair 160). Gear 42 is coupled to gear 74 by shaft 100. Gear 74 is engaged with input gear 78 on differential D.

To preselect $6^{th}$ gear, synchronizer 92 is first operated to couple gear 60 to outer shaft 106 of even lay shaft 18, and then synchronizer 88 is operated to couple gear 52 to outer shaft 106. When it is time to shift from $5^{th}$ gear to $6^{th}$ gear, the outer clutch 32 is disengaged and the inner clutch 30 is engaged. In $6^{th}$ gear, outer shaft 26 is coupled to and drives gear 34 (See FIG. 7F). Gear 34 is engaged with gear 52 of even lay shaft 18 (collectively, gear pair 150). Gear 52 is coupled to shaft 106 by synchronizer 88. Gear 60 is coupled to shaft 106 by synchronizer 92. Gear 60 is fixedly coupled to shaft 104. Gear 60 is coupled to gear 76 by shaft 104. Gear 76 is engaged with input gear 78 on differential D.

To preselect 7$^{th}$ gear, synchronizer 84 is first operated to couple gear 42 to shaft 102 of odd lay shaft 14, and then synchronizer 86 is operated to couple gear 50 to shaft 102. When it is time to shift from 6$^{th}$ gear to 7$^{th}$ gear, the inner clutch 30 is disengaged and the outer clutch 32 is engaged. In 7$^{th}$ gear, inner shaft 24 is fixedly coupled to and drives gear 38 (See FIG. 7G). Gear 38 is engaged with gear 50 of odd lay shaft 14 (collectively, gear pair 158). Gear 50 is coupled to shaft 102 by synchronizer 86. Shaft 102 is coupled to gear 42 by synchronizer 84. Gear 42 is fixedly coupled to shaft 100. Gear 42 is coupled to gear 74 by shaft 100. Gear 74 is engaged with input gear 78 on differential D.

To preselect 8$^{th}$ gear, synchronizer 92 is first operated to couple gear 60 to outer shaft 106 of even lay shaft 18, and then synchronizer 88 is operated to couple gear 54 to outer shaft 106. When it is time to shift from 7$^{th}$ gear to 8$^{th}$ gear, the outer clutch 32 is disengaged and the inner clutch 30 is engaged. In 8$^{th}$ gear, outer shaft 26 is fixedly coupled to and drives gear 36 (See FIG. 7H). Gear 36 is engaged with gear 54 of even lay shaft 18 (collectively, gear pair 152). Gear 54 is coupled to outer shaft 106 by synchronizer 88. Gear 60 is coupled to outer shaft 106 by synchronizer 92 and is fixedly coupled to inner shaft 104. As a result, gear 60 is coupled to gear 76 by inner shaft 104. Gear 76 is engaged with input gear 78 on differential D.

To preselect 9$^{th}$ gear, synchronizer 84 is first operated to couple gear 42 to outer shaft 102 of odd lay shaft 14, and then synchronizer 86 is operated to couple gear 48 to outer shaft 102. When it is time to shift from 8$^{th}$ gear to 9$^{th}$ gear, the inner clutch 30 is disengaged and the outer clutch 32 is engaged. In 9$^{th}$ gear, inner shaft 24 is fixedly coupled to and drives gear 40 (See FIG. 7I). Gear 40 is engaged with gear 48 of odd lay shaft 14 (collectively, gear pair 156). Gear 48 is coupled to outer shaft 102 by synchronizer 86. Outer shaft 102 is coupled to gear 42 by synchronizer 84. Gear 42 is fixedly coupled to shaft 100. Gear 42 is coupled to gear 74 by shaft 100. Gear 74 is engaged with input gear 78 on differential D.

To preselect 10$^{th}$ gear, synchronizer 80 is operated to couple extension gear 28 to outer shaft 26 of the input shaft 12. When it is time to shift from 9$^{th}$ gear to 10$^{th}$ gear, the inner clutch 30 is disengaged and the outer clutch 32 is engaged. In 10$^{th}$ gear, outer shaft 26 is fixedly coupled to and drives extension gear 28 (See FIG. 7J). Extension gear 28 is engaged with gear 46 of odd lay shaft 14 (collectively, gear pair 154). Gear 46 is fixedly coupled to outer shaft 102. Outer shaft 102 is coupled to gear 42 by synchronizer 84. Gear 42 is fixedly coupled to shaft 100. Gear 42 is coupled to gear 74 by shaft 100. Gear 74 is engaged with input gear 78 on differential D.

To operate the double-range DCT in low range reverse, synchronizer 96 of even range change shaft 20 is operated to couple gear 66 to shaft 110, and synchronizer 90 of even lay shaft 18 is operated to couple gear 58 to outer shaft 106. In low range reverse, outer shaft 26 is fixedly secured to and drives gear 34 (See FIG. 7K). Gear 34 is engaged with gear 70 of reverse shaft 22 (collectively, gear pair 168). Gear 70 is fixedly secured to shaft 112. Gear 72 is fixedly secured to shaft 112. Gear 72 is engaged with gear 58 (collectively, gear pair 170). Gear 58 is coupled to outer shaft 106 by synchronizer 90. Outer shaft 106 is fixedly coupled to gear 56. Gear 56 is engaged with gear 66 of the even range change shaft 20 (collectively, gear pair 164). Gear 66 is coupled to shaft 110 by synchronizer 96. Shaft 110 is fixedly coupled to gear 68. Gear 68 is engaged with gear 60 of the even lay shaft 18 (collectively, gear pair 166). Gear 60 is fixedly secured to inner shaft 104. Inner shaft 104 is fixedly coupled to gear 76. Gear 76 is engaged with input gear 78 of differential D.

To operate the double-range DCT in high range reverse, synchronizer 90 of even lay shaft 18 is operated to couple gear 58 to outer shaft 106, and synchronizer 92 of even lay shaft 18 is operated to couple gear 60 to outer shaft 106. In high range reverse, outer shaft 26 is fixedly secured to and drives gear 34 (See FIG. 7L). Gear 34 is engaged with gear 70 of reverse shaft 22 (collectively, gear pair 168). Gear 70 is fixedly secured to shaft 112. Gear 72 is fixedly secured to shaft 112. Gear 72 is engaged with gear 58 (collectively, gear pair 170). Gear 58 is coupled to outer shaft 106 by synchronizer 90. Gear 60 is coupled to outer shaft 106 by synchronizer 92. Gear 60 is fixedly secured to inner shaft 104. Inner shaft 104 is fixedly coupled to gear 76. Gear 76 is engaged with input gear 78 of differential D.

It should be noted that both low range reverse and high range reverse can be preselected from 1$^{st}$ gear, and vice versa. The ability to use pre-selection in gear transitions from 1$^{st}$ to reverse (low or high range) and from reverse to 1$^{st}$ (low or high range) permits an operator to produce a low speed rocking motion using clutch handover. This may be useful when attempting to rock the vehicle, such as when stuck in snow, mud or other slippery terrain.

Figure 14:
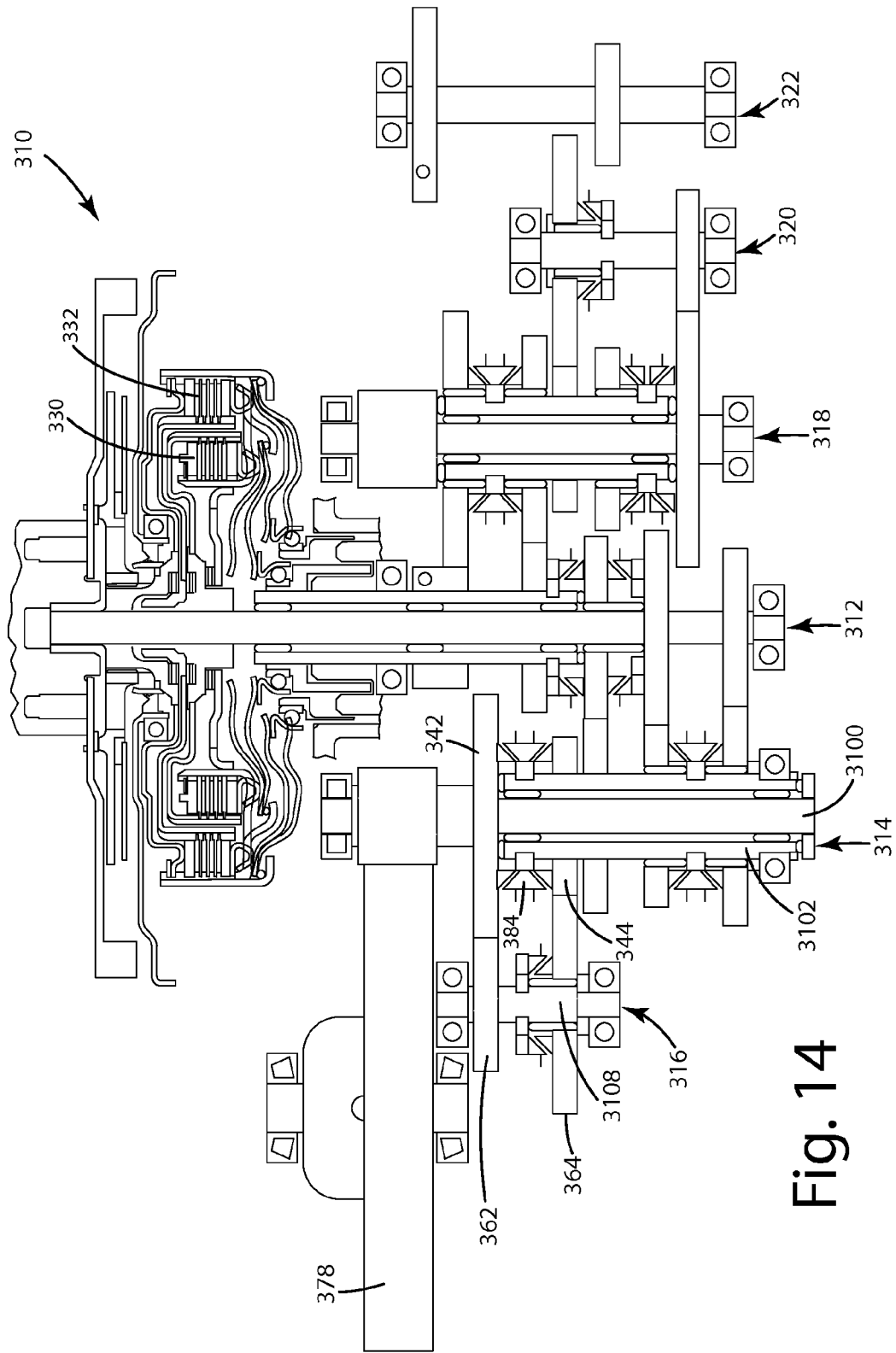
FIG. 14 is a schematic representation of an alternative embodiment of the 10-speed double-range DCT of FIG. 1.
Figure 15:
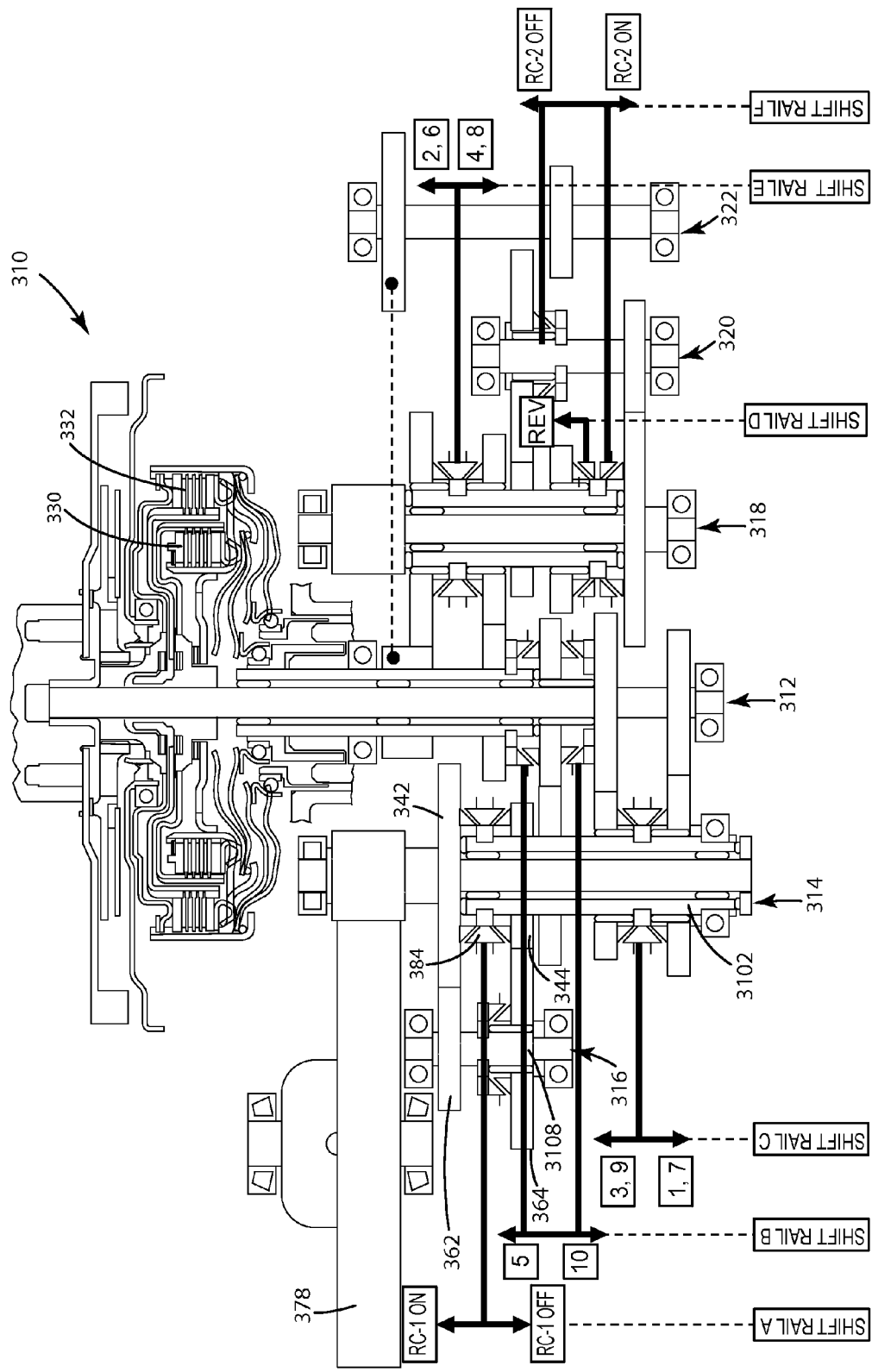
FIG. 15 is a schematic representation of the alternative 10-speed double-range DCT annotated with information relating to shift rail connectivity.

The synchronizer arrangement and shift rail connectivity of double-range DCT 10 is merely exemplary. The number and arrangement of synchronizers may vary from application to accommodate different gear shifting options. For example, an alternative 10-speed double-range DCT 310 is show in FIGS. 14-15. Double-speed DCT 310 is essentially identical to DCT 10, except as specifically described. To facilitate disclosure, FIGS. 14-15 use reference numerals that correspond with the reference numerals used in the figures associated with DCT 10, except that each reference numeral is preceded by a "3" (e.g. input shaft 12 of DCT 10 is input shaft 312 of DCT 310). Referring now to FIG. 14, DCT 310 varies from DCT 10 in that half synchronizer 94 is eliminated and half synchronizer 84 is replaced by synchronizer 384. Further, the connections between the related gears and shafts are adjusted. More specifically, gear 364 is fixedly joined to shaft 3108, and gear 344 is decoupled from outer shaft 3102. As a result of these changes, the odd range change shaft 316 can be engaged and disengaged by synchronizer 384. To accommodate these changes, the shift rail connectivity varies slightly between DCT 10 and DCT 310. More specifically, with reference to FIG. 15, the shift rail connectivity of DCT 310 is essentially identical to that of DCT 10, except that shift rail A in DCT 310 is coupled to synchronizer 384, rather than to half synchronizers 84 and 94. In operation, shift rail A can be moved in one direction to engage outer shaft 3102 with gear 342 or in the opposite direction to engage outer shaft 3102 with gear 344. When outer shaft 3102 is engaged with gear 344, the odd range change shaft 316 is coupled to the odd lay shaft 314.

The present invention has so far been described with reference to a 10-speed double-range DCT. The present invention may be implemented in transmissions with a different number of speeds. For example, the present invention may be implemented in a 12-speed double-range DCT.

Figures 8, 9:
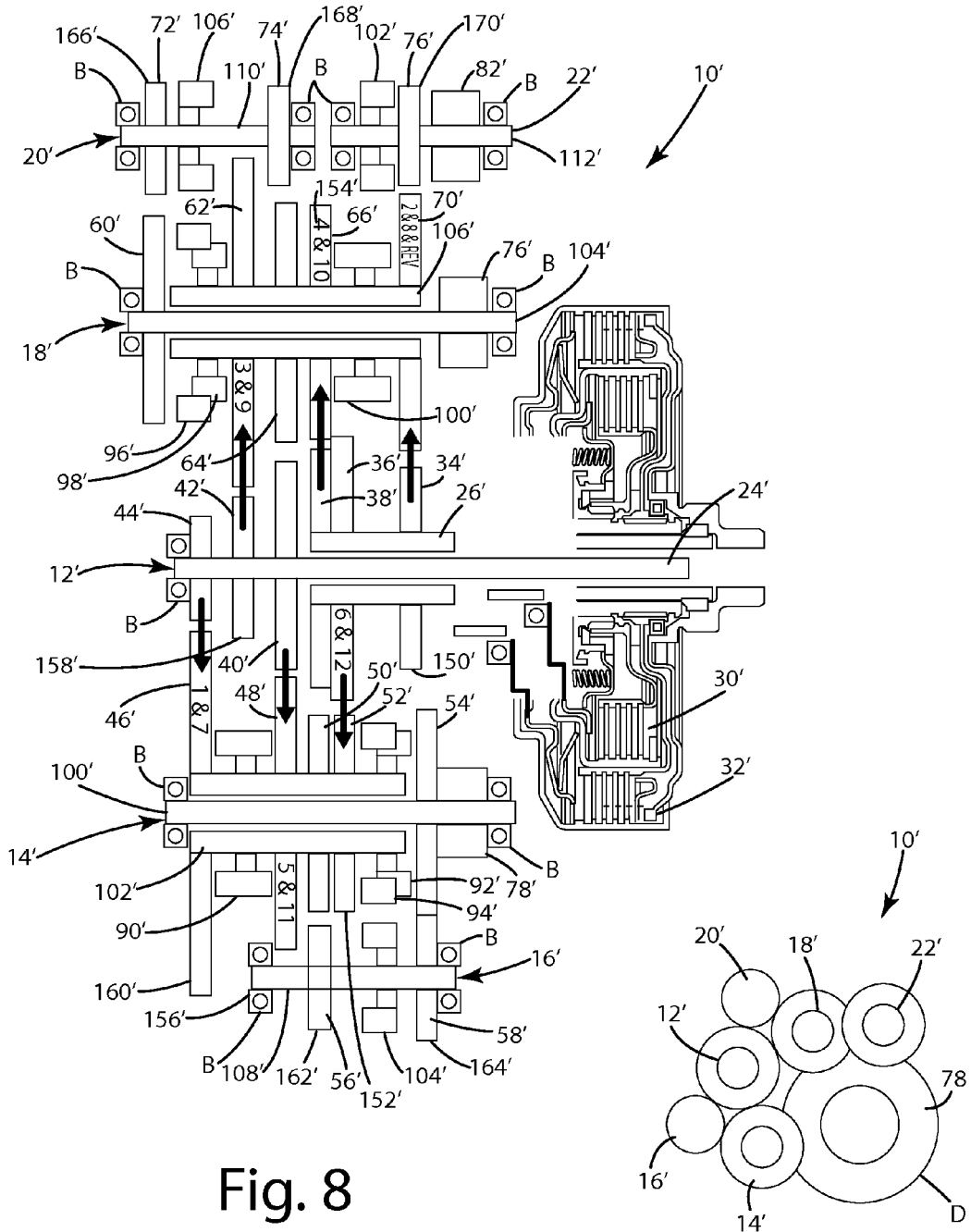
FIG. 8 is a schematic representation of 12-speed double-range DCT in accordance with an alternative embodiment of the present invention.
FIG. 9 is a schematic end view of the 12-speed double-range DCT.

One exemplary embodiment of a 12-speed double-range DCT 10' is schematically in FIGS. 8 and 9. Double-range DCT 10' generally includes a includes an input shaft 12', a first lay shaft 14', a first range change shaft 16', a second lay shaft 18', a second range change shaft 20' and a reverse shaft 22'. The input shaft 12' has inner and outer shafts 24', 26' that can be selectively coupled to the engine (not shown) by a dual clutch. The dual clutch has an outer clutch 32' for selectively coupling the inner shaft 24' to the engine, and an inner clutch 30' for selectively coupling the outer shaft 26' to the engine. The input shaft 12' is coupled to the first lay shaft 14' and the second lay shaft 18' by a variety of different gear pairings (as described below). FIG. 9 is an end view of the 12-speed double-range DCT 10' showing the relationship of the various shafts of this embodiment. As can be seen, in the illustrated embodiment, the lay shafts 14' and 18' are generally disposed between the input shaft 12' and the input gear 78' of the differential D. The range change shafts 14' and 18' are generally disposed somewhat outside the lay shafts 14' and 18' where they are capable of interacting with the lay shafts 14' and 18'. The reverse shaft 22' is generally disposed adjacent to differential input gear 78' and lay shaft 18' as it is capable of being engaged with both.

Referring again to FIG. 8, DCT 10' includes a variety of gear pairs that are in constant engagement with one another and are selectively joined to the torque path depending on the gear of operation. Gears 34' and 70' form gear pair 150', which is part of the torque path in $2^{nd}$, $8^{th}$ and reverse gears. Gears 36' and 52' form gear pair 152', which is part of the torque path in $6^{th}$ and $12^{th}$ gears. Gears 38' and 66' form gear pair 154', which is part of the torque path in $4^{th}$ and $10^{th}$ gears. Gears 40' and 48' form gear pair 156', which is part of the torque path in $5^{th}$ and $11^{th}$ gears. Gears 42' and 62' form gear pair 158', which is part of the torque path in $3^{rd}$ and $9^{th}$ gears. Gears 44' and 46' form gear pair 160', which is part of the torque path for $1^{st}$ and $7^{th}$ gears. Gears 50' and 56' form gear pair 162', which is part of the torque path for $1^{st}$, $5^{th}$ and $6^{th}$ gears. Gears 54' and 58' form gear pair 164', which is part of the torque path for $1^{st}$, $5^{th}$ and $6^{th}$ gears. Gears 60' and 72' form gear pair 166', which is part of the torque path for $2^{nd}$, $3^{rd}$ and $4^{th}$ gears. Gears 64' and 74' form gear pair 168', which is part of the torque path for $2^{nd}$, $3^{rd}$ and $4^{th}$ gears. Gears 70' and 76' form gear pair 170', which is part of the torque path for $2^{nd}$, $8^{th}$ and reverse gears.

The double-range DCT 10' also includes a plurality of synchronizers that are operable to move the DCT 10' through its various speeds. In this embodiment, the first lay shaft 14' includes synchronizer 90' for selectively joining outer shaft 102' to gear 46' or 48', and a dual half synchronizer with half synchronizer 92' for selectively joining outer shaft 102' to gear 52' and half synchronizer 94' for selectively joining outer shaft 102' to gear 54'. The second lay shaft 18' includes a dual half synchronizer with half synchronizer 96' for selectively joining outer shaft 106' to gear 60' and half synchronizer 98' for selectively joining outer shaft 106' to gear 62', and synchronizer 100' for selectively joining outer shaft 106' to gear 66' or gear 70'. First range change shaft 16' includes synchronizer 104' for selectively joining shaft 108' to gear 58'. Second range change shaft 20' includes synchronizer 106' for selectively joining shaft 110' to gear 72'. Finally, reverse shaft 22' includes synchronizer 102' for selectively joining shaft 112' to gear 76'.

In this embodiment, $1^{st}$, $3^{rd}$, $5^{th}$, $7^{th}$, $9^{th}$ and $11^{th}$ speeds are powered through the inner input shaft 24', and $2^{nd}$, $4^{th}$, $6^{th}$, $8^{th}$, $10^{th}$, $12^{th}$ and reverse are powered through the outer input shaft 26'. As a result, double-range DCT 10' is capable of preselecting sequential gears and implementing a clutch handover. This is also true with respect to $1^{st}$ and reverse gears. So, as with DCT 10, DCT 10' allows an operator to produce a low speed rocking motion using clutch handover.

Like DCT 10, the 12-speed double-range DCT 10' of the illustrated embodiment may include a generally conventional DCT control system (not shown) modified to accommodate the variations of the present invention as set forth in this description. Given that the present invention may incorporate a generally conventional control system, the control system will not be described in detail. Suffice it to say that the control system may include a plurality of shift rails and shift forks (not shown) for operating the synchronizers as desired to move between different transmission speeds. Operation of the shift rails and shift forks may be automated using a computer controlling a hydraulic, pneumatic, electric or other type of actuation system. The design, configuration and operation of shift rails, shift forks and associated control systems are well known and will not be described in detail. The computer control (not shown) may also control operation of the drive clutches, including the timing and manner of engagement and disengagement of inner clutch 30' and outer clutch 32', as discussed above in connection with DCT 10. The double-range DCT 10' may incorporate the hydraulic control system shown in U.S. patent Ser. No. 13/576,949 (described above) to allow hydraulic fluid and lubricating fluid to be supplied by a single motor coupled to two pumps.

Synchronizer Assembly.

Referring now to FIGS. 10-13, an improved dual half synchronizer is illustrated and generally designated 200. As set forth below, the synchronizer 200 includes a synchronizer hub 202 and independently controllable split sleeves 204, 206 adapted to sequentially and simultaneously engage two gears. The synchronizer 200 can be used in connection with the dual clutch transmissions described above in connection with FIGS. 1-9, where the shift sleeves are depicted as items 90 and 92. The synchronizer 200 can also be used in connection with other transmissions, whether now known or hereinafter developed, including single clutch transmissions and transmission where space savings is not desired.

More particularly, the synchronizer hub 202 is a unitary component including a first axial face 208, and second axial face 210, a splined inner diameter 212, and a splined outer diameter 214. The first axial face 208 includes a first plurality of circumferentially spaced recesses 216, and the second axial face 210 includes a second plurality of circumferentially spaced recesses 218. The first and second plurality of recesses 216, 218 are radially offset from each other and are each sized to receive a synchronizer strut therein.

Figure 11:
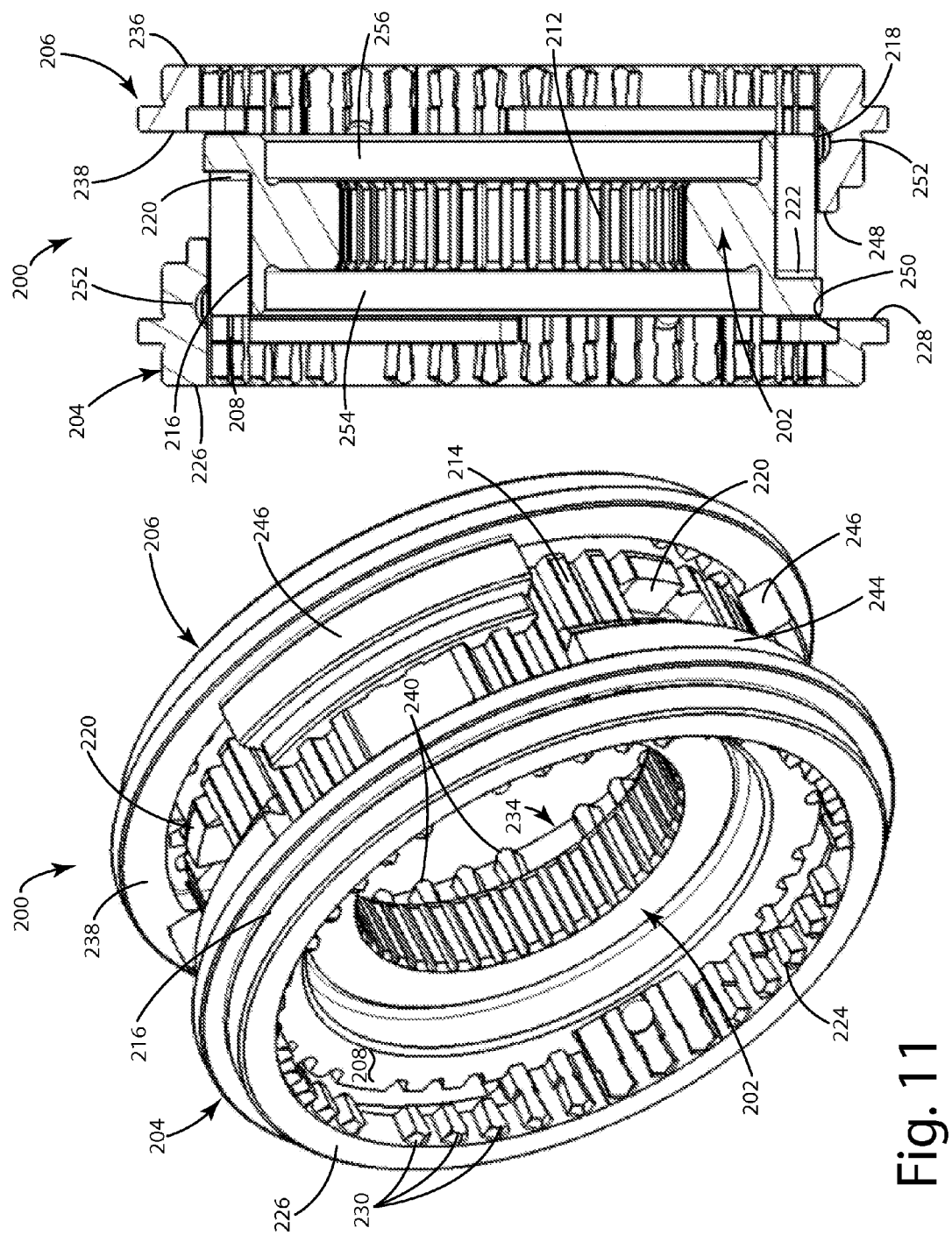
FIG. 11 is a perspective view and a side cross-sectional view of the improved synchronizer of FIG. 10 illustrating first and second sleeves in the extended position.

As perhaps best shown in FIG. 11, the synchronizer hub 202 includes multiple stops 220, 222 to limit axial movement of the first and second shift sleeves 204, 206. In particular, the synchronizer hub 202 includes a first plurality of stops 220 spaced equidistant from each other about the outer diameter 214 of the synchronizer hub 202. In like manner, the synchronizer hub 202 includes a second plurality of stops 222 spaced equidistant from each other about the outer diameter 214 of the synchronizer hub 202. The stops 220, 222 are wider than the adjacent outer splines, being shaped to intercept a corresponding inner spline on the first or second shift sleeves 204, 206. In the illustrated embodiment, the first plurality of stops 220 includes three stops that are spaced one-hundred-and-twenty-degrees apart from each other, and the second plurality of stops 222 includes three stops that are spaced one-hundred-and-twenty-degrees apart from each other, with the first and second plurality of stops 220, 222 being radially offset from each other. The first plurality of stops 220 is closer to the second axial face 210 than to the first axial face 208, thereby limiting movement of the first shift sleeve 204 toward the second axial face 210. The second plurality of stops 222 is closer to the first axial face 208 than to the second axial face 210, thereby limiting movement of the second shift sleeve 206 toward the first axial face 208. The first and second plurality of stops 220, 222 are integrally formed with the synchronizing hub in the present embodiment, while in other embodiments the first and second plurality of stops 220, 222 are separately formed and attachable to the hub 202.

Referring again to FIGS. 10-11, the dual synchronizer 200 includes first and second sleeves 204, 206 that are movable between a retracted position (FIG. 10) and an extended position (FIG. 11). In the retracted position, the first and second sleeves 204, 206 cooperate to define a width that is approximately coextensive with the width of the synchronizer hub 202. In the extended position, the first and second sleeve 204, 206 telescope axially outwardly to engage respective first and second gears. The first sleeve 204 includes a splined inner diameter 224, an outer axial face 226, and an inner axial face 228 distal from the outer axial face 226. The splined inner diameter 224 includes a plurality of synchronizer teeth 230 for engagement with a first dog gear. The first sleeve 204 additionally includes a flange 232 for actuation by a first shift fork. In like manner, the second sleeve 206 includes a splined inner diameter 234, an outer axial face 236, and an inner axial face 238 distal from the outer axial face 236. The splined inner diameter 234 includes a plurality of synchronizer teeth 240 for engagement with a second dog gear. The second sleeve 206 additionally includes a flange 242 for actuation by a second shift fork.

Figure 10:
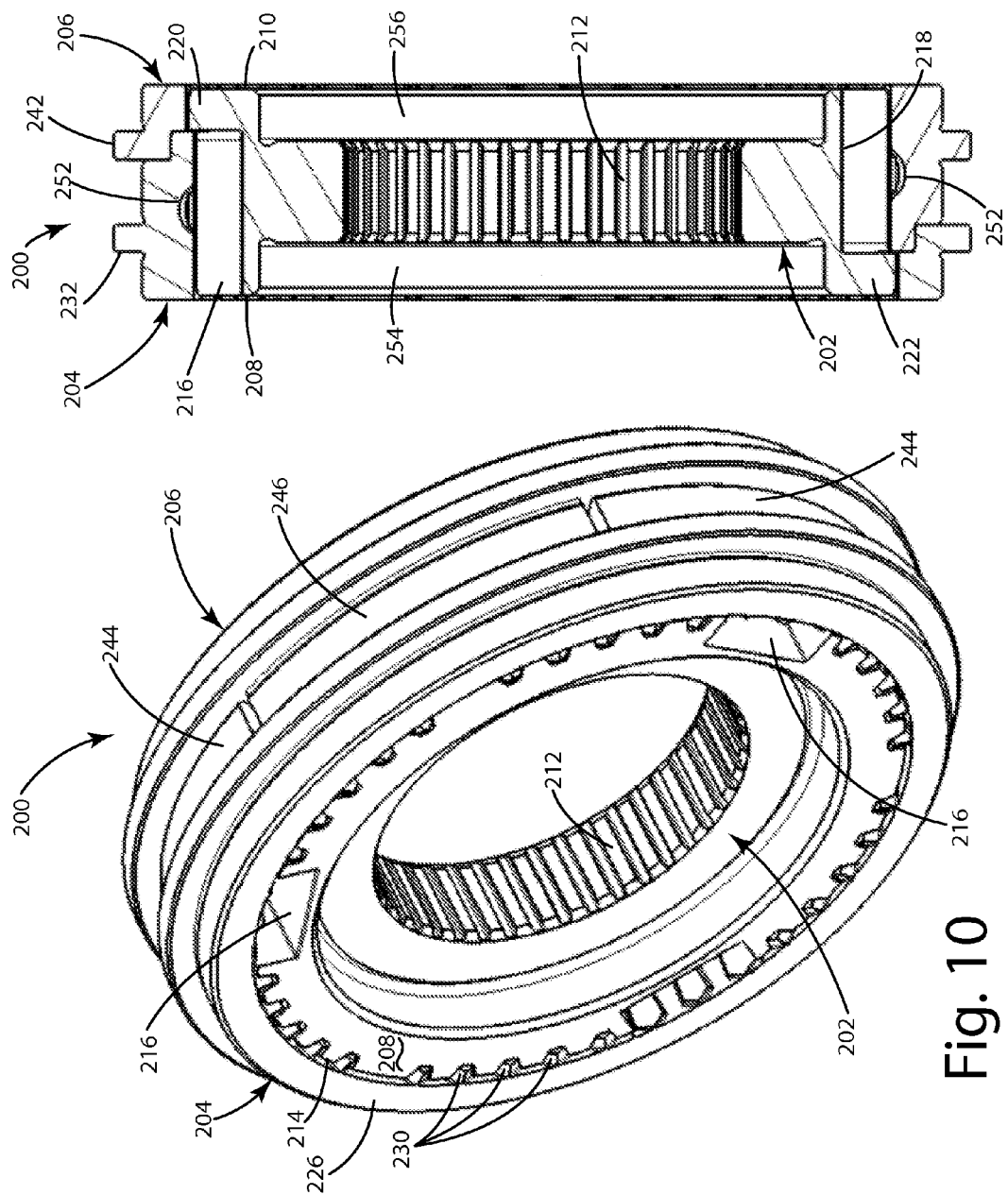
FIG. 10 is a perspective view and a side cross-sectional view of an improved synchronizer illustrating first and second sleeves in the retracted position.

As also shown in FIGS. 10-11, the first and second sleeves 204, 206 each include a plurality of axial projections 244, 246 that project laterally from the respective inward axial face 228, 238. The projections 244, 246 are radially offset from each other, such that they interfit with each other when the first and second sleeves 204, 206 are in the retracted position. The projections 244, 246 are generally arcuate-rectangular in the present embodiment, forming respective first and second axially interlocking castellations about the outer periphery of the synchronizer 200. For example, each sleeve 204, 206 can include four projections, with each projection spanning forty-five-degrees and being spaced apart from the radially adjacent projection by forty-five-degrees. Also by example, each sleeve 204, 206 can include three projections, with each projection spanning sixty-degrees and being spaced apart from the radially adjacent projection by sixty-degrees. Each projection 244, 246 additionally supports the corresponding plurality of synchronizer teeth 230, 240. In addition, the projections 244, 246 are optionally stepped. That is, each projection 244, 246 can include a lip 248 to interfit with a shoulder 250 in the opposing sleeve (see FIG. 11 below right). Together the lip 248 and the shoulder 250 cooperate to strengthen the overall synchronizer assembly 200 when the first and second sleeves 204, 206 are retracted in a nested configuration. In addition, the projections 244, 246 also include a single annular depression, race or groove 252 on the underside thereof to receive a spring loaded insert, optionally a spring loaded ball insert used in conventional blocker ring synchronizers.

Figure 12:
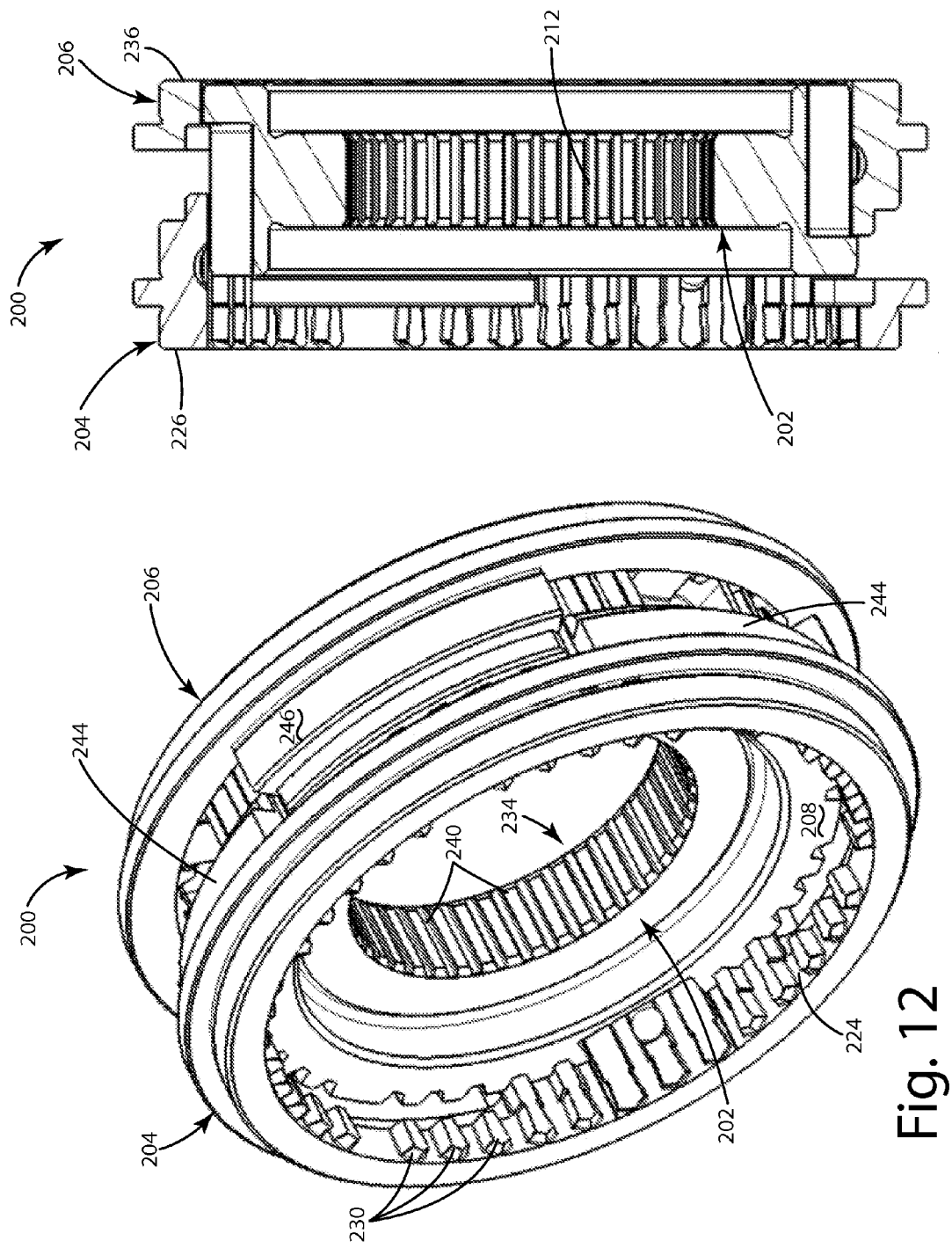
FIG. 12 is a perspective view and a side cross-sectional view of the improved synchronizer of FIG. 10 illustrating the first sleeve in the extended position.
Figure 13:
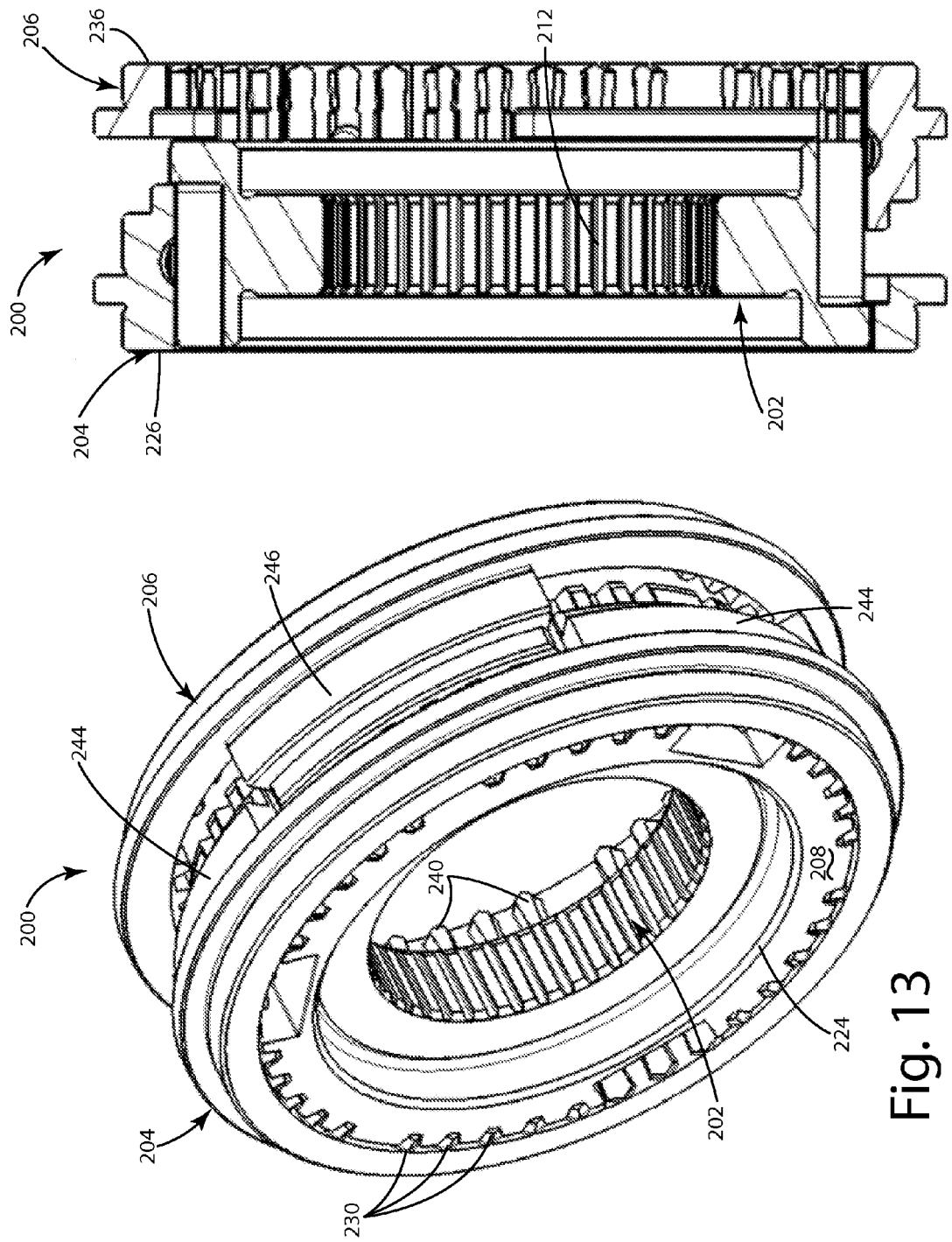
FIG. 13 is a perspective view and a side cross-sectional view of the improved synchronizer of FIG. 10 illustrating the second sleeve in the extended position.

As noted above, the synchronizer 200 is adapted to engage two gears, simultaneously or sequentially, and further adapted to engage only one gear. The synchronizer 200 therefore has one neutral position (FIG. 10) and three engaged positions (FIGS. 11-13). As shown in FIG. 12 for example, the first sleeve 204 is in the extended position, while the second sleeve 206 is in the retracted position. As alternatively shown in FIG. 13, the first sleeve 204 is in the retracted position, while the second sleeve 206 is in the extended position. In the extended position, the respective sleeve 204, 206 telescopes outwardly from the synchronizer hub 202, such that the respective sleeve teeth 230, 240 engage the desired gear, typically the dog teeth of the desired gear. In the retracted position, the respective sleeve 204, 206 includes an outer axial 226, 236 surface that is generally flush with the hub outer axial surface 208, 210. In addition, the splined inner diameter 212 is generally narrower than the remaining portions of the synchronizer hub 202, being bounded by first and second cutout regions 254, 256 of the synchronizer hub 202 to receive a blocker ring therein, which frictionally engages a corresponding conical hub of a desired gear when actuated.

More particularly, actuation of the synchronizer 200 is initiated with movement of a respective first or second shift fork, each being coupled to a respective shift sleeve 204, 206. When the first shift fork is moved out of neutral, the first shift sleeve 204 telescopes outwardly from the neutral position toward the first gear wheel (left, as shown in FIGS. 10-13). The shift sleeve 204 carries three synchronizer struts (received in the first plurality of recesses 216), which urge a first blocking ring into frictional engagement with the first gear wheel. When the first blocking ring and the first gear wheel are rotating at substantially the same speed, the first blocking ring and the first synchronizer sleeve 204 become indexed, and the first plurality of synchronizer teeth 230 are allowed engage the first gear wheel dog teeth. Similarly, when the second shift fork is moved out of neutral, the second shift sleeve 206 telescopes outwardly from the neutral position toward the second gear wheel (right, as shown in FIGS. 10-13). The shift sleeve 206 carries three synchronizer struts (received in the second plurality of recesses 218), which urge a second blocking ring into frictional engagement with the second gear wheel. When the second blocking ring and the second gear wheel are rotating at the same speed, the second blocking ring and the second synchronizer sleeve 206 become indexed, and the second plurality of synchronizer teeth 240 are allowed to engage the second gear wheel dog teeth. Movement of the respective shift forks therefore initiates an engagement with the respective gear wheel, either sequentially or simultaneously, creating a torque path between the shaft about which the synchronizer is carried and the first and/or second gear wheels. A reverse movement of the shift forks initiates a disengagement, rapidly returning the shift sleeves to the neutral position as shown in FIG. 10. By using a single hub 202, the synchronizer 200 occupies less axial length than two half synchronizers, in some instance 3 mm or more. The synchronizer 200 also reduces parts count, improves assembly, and reduces mass over existing half synchronizer solutions without adversely affecting the functionality or the durability of the synchronizer 200.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A synchronizer comprising:
a synchronizer hub interposed between first and second gears and including a splined inner diameter and a splined outer diameter; and
first and second shift sleeves mounted about the synchronizer hub and each including a plurality of synchronizer teeth to engage a respective first or second gear;
wherein the first shift sleeve is movable in a first axial direction from a retracted position to an extended position and wherein the second shift sleeve is moveable in a second axial direction from a retracted position to an extended position, the first and second shift sleeves being adapted to simultaneously couple the synchronizer hub to the first and second gears when the first and second shift sleeves are in the respective extended positions.

2. The synchronizer of claim 1 wherein the first shift sleeve includes a first plurality of axial projections and the second shift sleeve includes a second plurality of axial projections radially offset from first plurality of axial projections.

3. The synchronizer of claim 2 wherein the first and second plurality of axial projections interfit with each other when the first and second shift sleeves are in the respective retracted positions.

4. The synchronizer of claim 2 wherein the first plurality of projections includes a first castellation and wherein the second plurality of projections includes a second castellation complimentary to the first castellation.

5. The synchronizer of claim 1 wherein the synchronizer hub outer diameter includes a first plurality of stops to limit axial movement of the first shift sleeve.

6. The synchronizer of claim 5 wherein the synchronizer hub outer diameter includes a second plurality of stops to limit axial movement of the second shift sleeve.

* * * * *